United States Patent
Hatakeyama

(10) Patent No.: US 10,033,325 B2
(45) Date of Patent: Jul. 24, 2018

(54) HEAT PUMP DEVICE, AND AIR CONDITIONER, HEAT PUMP WATER HEATER, REFRIGERATOR, AND FREEZING MACHINE THAT INCLUDES HEAT PUMP DEVICE

(71) Applicant: Mitsubishi Electric Corporation, Tokyo (JP)

(72) Inventor: Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 15/502,033

(22) PCT Filed: Sep. 26, 2014

(86) PCT No.: PCT/JP2014/075749
§ 371 (c)(1),
(2) Date: Feb. 6, 2017

(87) PCT Pub. No.: WO2016/046993
PCT Pub. Date: Mar. 31, 2016

(65) Prior Publication Data
US 2017/0237380 A1    Aug. 17, 2017

(51) Int. Cl.
*H02P 27/04* (2016.01)
*H02P 27/08* (2006.01)
(Continued)

(52) U.S. Cl.
CPC .............. *H02P 27/08* (2013.01); *F25B 13/00* (2013.01); *F25B 30/02* (2013.01); *F25B 49/025* (2013.01);
(Continued)

(58) Field of Classification Search
CPC .... H02M 3/156; H02M 7/483; H02M 7/5387; B60L 11/1879
See application file for complete search history.

(56) References Cited

U.S. PATENT DOCUMENTS 8,421,386 B2    4/2013    Takahashi et al.
9,077,274 B2    7/2015    Shinomoto et al.
(Continued)

FOREIGN PATENT DOCUMENTS

JP    09-037593 A    2/1997
JP    2011-038689 A    2/2011
(Continued)

OTHER PUBLICATIONS

International Search Report of the International Searching Authority dated Oct. 21, 2014 for the corresponding international application No. PCT/JP2014/075749 (and English translation).

*Primary Examiner* — Shawki S Ismail
*Assistant Examiner* — Zoheb Imtiaz
(74) *Attorney, Agent, or Firm* — Posz Law Group, PLC

(57) ABSTRACT

A heat pump device includes a compressor compressing refrigerant; a motor driving the compressor; an inverter applying alternating-current voltage to the motor; and an inverter control unit generating a control signal for controlling the inverter. The inverter control unit executes control by using a first switching pattern in which all of three switching elements on a positive or negative voltage side of the inverter are changed to an ON state, then executes control by using a second switching pattern in which two switching elements to which electric current flows in the same direction when controlled by using the first switching pattern are changed to an OFF state, and then executes control by using a third switching pattern in which two switching elements on a reverse voltage side of the two switching elements changed to an OFF state by using the second switching pattern are changed to an ON state.

11 Claims, 18 Drawing Sheets

(51) Int. Cl.
  *F25B 49/02* (2006.01)
  *F25B 30/02* (2006.01)
  *F25B 13/00* (2006.01)
(52) U.S. Cl.
  CPC ... *F25B 2600/021* (2013.01); *F25B 2600/024* (2013.01)

(56) References Cited

U.S. PATENT DOCUMENTS

| | | |
|---|---|---|
| 9,263,984 B2 | 2/2016 | Hatakeyama et al. |
| 9,322,587 B2 | 4/2016 | Shinomoto et al. |
| 2010/0134053 A1* | 6/2010 | Yamada ............ H02M 7/53875 318/162 |
| 2013/0269370 A1 | 10/2013 | Hatakeyama et al. |
| 2013/0314965 A1* | 11/2013 | Shinohara ........... H02M 7/5387 363/132 |
| 2015/0318784 A1* | 11/2015 | Wu ....................... H02M 3/158 323/283 |

FOREIGN PATENT DOCUMENTS

| | | |
|---|---|---|
| JP | 2011-142791 | 7/2011 |
| WO | 2012/107987 A1 | 8/2012 |
| WO | 2012/147192 A1 | 11/2012 |
| WO | 2012/172684 A1 | 12/2012 |

* cited by examiner

FIG.5

| SWITCHING PATTERN | VOLTAGE DIREC-TION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | -U | 0 | 1 | 1 | 1 | 0 | 0 |
| V4 | +U | 1 | 0 | 0 | 0 | 1 | 1 |
| V5 | -V | 1 | 0 | 1 | 0 | 1 | 0 |
| V6 | -W | 1 | 1 | 0 | 0 | 0 | 1 |
| V7 | 0 | 1 | 1 | 1 | 0 | 0 | 0 |

FIG.14

| SWITCHING PATTERN | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | -U | 0 | 1 | 1 | 1 | 0 | 0 |
| V4 | +U | 1 | 0 | 0 | 0 | 1 | 1 |
| V5 | -V | 1 | 0 | 1 | 0 | 1 | 0 |
| V6 | -W | 1 | 1 | 0 | 0 | 0 | 1 |
| V7 | 0 | 1 | 1 | 1 | 0 | 0 | 0 |
| V0' | IN-DEFINITE | 0 | 0 | 0 | 0 | 1 | 1 |
| V7' | IN-DEFINITE | 0 | 1 | 1 | 0 | 0 | 0 |
| V7" | IN-DEFINITE | 1 | 0 | 0 | 0 | 0 | 0 |
| V0" | IN-DEFINITE | 0 | 0 | 0 | 1 | 0 | 0 |

HEAT PUMP DEVICE, AND AIR CONDITIONER, HEAT PUMP WATER HEATER, REFRIGERATOR, AND FREEZING MACHINE THAT INCLUDES HEAT PUMP DEVICE

CROSS REFERENCE TO RELATED APPLICATION

This application is a U.S. national stage application of International Patent Application No. PCT/JP2014/075749 filed on Sep. 26, 2014, the disclosure of which is incorporated herein by reference.

TECHNICAL FIELD

The present invention relates to an inverter control technology used when a compressor is controlled by an inverter. In particular, the present invention relates to a technology for heating a compressor by applying to the compressor a voltage (hereinafter, "high-frequency voltage") having a frequency higher than the frequency (hereinafter, "inverter frequency") at which the inverter drives the compressor.

BACKGROUND

There is a conventional technology in which, in an inverter that applies a high-frequency voltage to a compressor to heat the compressor, when the voltage vector is changed from a zero vector V0 or a zero vector V7 to a real vector V3 or a real vector V4, switching elements are controlled such that only switching elements for one phase are turned off, thereby reducing the off time of the switching elements and thus suppressing a drop in the output voltage (for example, Patent Literature 1).

PATENT LITERATURE

Patent Literature 1: International Publication No. 2012/107987

It can be said that the technology disclosed in Patent Literature 1 is a technology that increases the rate of voltage change over time (hereinafter, "dV/dt" as appropriate) by shifting the vector from the zero vector V0 or the zero vector V7 to the real vector V3 or the real vector V4 by turning only the switching elements for one phase off, thereby preventing a voltage drop.

However, due to the increase in dV/dt, high-frequency noise to be generated increases. When the vector starts to shift from the zero vector to the real vector, because the current polarity is different from the voltage polarity due to the regeneration phenomenon, a negative electric power is instantaneously generated. Thus, in addition to an increase of the high-frequency noise, there is a possibility that electric power to be input to the compressor decreases.

SUMMARY

The present invention has been achieved in view of the above, and an object of the present invention is to obtain a heat pump device that can prevent a drop in power supplied to a compressor due to regeneration, while reducing high-frequency noise.

In order to solve the above problems and achieve the object, a heat pump device according to an aspect of the present invention includes: a compressor compressing a refrigerant; a motor driving the compressor; an inverter applying an alternating-current voltage to the motor; and an inverter control unit generating a control signal for controlling the inverter. The inverter control unit executes control by using a first switching pattern in which all of three switching elements on a positive voltage side or a negative voltage side of the inverter are changed to an ON state, then executes control by using a second switching pattern in which two switching elements to which an electric current flows in a same direction when controlled by using the first switching pattern are changed to an OFF state, and then executes control by using a third switching pattern in which two switching elements on a reverse voltage side of the two switching elements that are changed to an OFF state by using the second switching pattern are changed to an ON state.

Advantageous Effects of Invention

According to the present invention, an effect is obtained where a drop in power supplied to a compressor due to regeneration can be prevented while high-frequency noise is reduced.

BRIEF DESCRIPTION OF DRAWINGS

FIG. 5 is a diagram illustrating eight switching patterns in the first embodiment.

FIG. 14 is a diagram illustrating twelve switching patterns newly defined in the first embodiment.

DETAILED DESCRIPTION

First Embodiment

In a first embodiment, a basic configuration and operation of a heat pump device 100 will be described.

Figure 1:
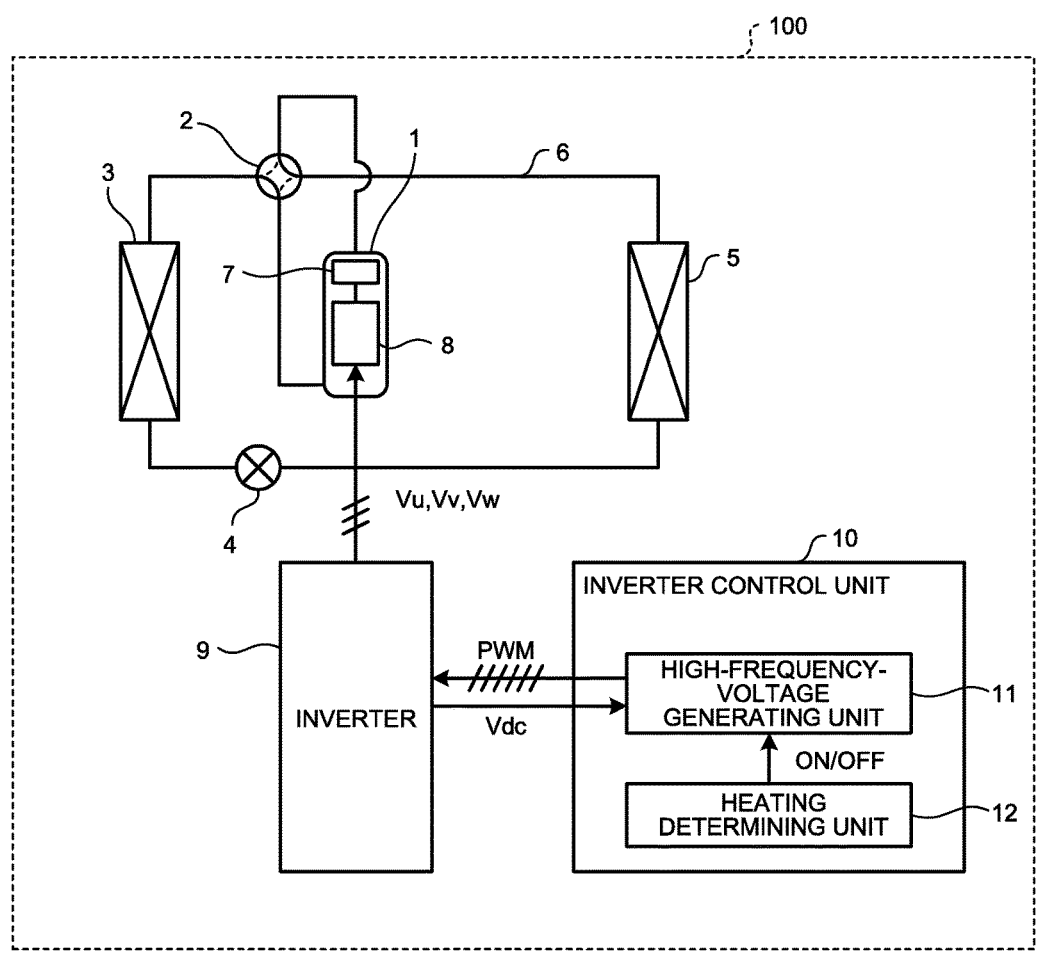
FIG. 1 is a diagram illustrating an example configuration of a heat pump device according to a first embodiment.

FIG. 1 is a diagram illustrating an example configuration of the heat pump device 100 according to a first embodiment. The heat pump device 100 according to the first embodiment includes a refrigeration cycle in which a compressor 1, a four-way valve 2, a heat exchanger 3, an expansion mechanism 4, and a heat exchanger 5 are sequentially connected via a refrigerant pipe 6. A compression mechanism 7, which compresses a refrigerant, and a motor 8, which actuates the compression mechanism 7, are provided in the compressor 1. The motor 8 is a three-phase motor including windings for three phases, i.e., U-phase, V-phase, and W-phase.

An inverter 9, which applies a voltage to the motor 8 to drive the motor 8, is electrically connected to the motor 8. The inverter 9 applies voltages Vu, Vv, and Vw to the U-phase, V-phase, and W-phase windings of the motor 8, respectively.

The inverter 9 is electrically connected to an inverter control unit 10. The inverter control unit 10 includes a heating determining unit 12 that determines whether it is necessary to heat the motor 8; and a high-frequency-voltage generating unit 11 that executes control to apply a high-frequency voltage to the motor 8.

The inverter control unit 10 executes driving control such that the inverter 9 is operated either in a compression operation mode in which the compressor 1 is caused to compress the refrigerant or in a heating operation mode in which the compressor 1 is heated. When the inverter 9 is operated in the compression operation mode, the inverter 9 is caused to generate an AC voltage having a frequency at which the motor 8 rotates, and when the inverter 9 is operated in the heating operation mode, the inverter 9 is caused to generate a high-frequency voltage having a frequency at which the motor 8 does not rotate and which is higher than the frequency of the AC voltage to be generated in the case of the compression operation mode.

A bus voltage Vdc, which is the power-supply voltage of the inverter 9, is transmitted to the high-frequency-voltage generating unit 11 from the inverter 9. When the heating determining unit 12 determines that it is necessary to heat the motor 8, the heating determining unit 12 outputs an ON signal to the high-frequency-voltage generating unit 11. When the heating determining unit 12 determines that it is not necessary to heat the motor 8, the heating determining unit 12 outputs an OFF signal to the high-frequency-voltage generating unit 11. When the ON signal is output from the heating determining unit 12, the high-frequency-voltage generating unit 11 generates pulse width modulation (hereinafter, "PWM") signals for applying the high-frequency voltage to the motor 8 on the basis of the input bus voltage Vdc and outputs the PWM signals to the inverter 9.

Figure 2:
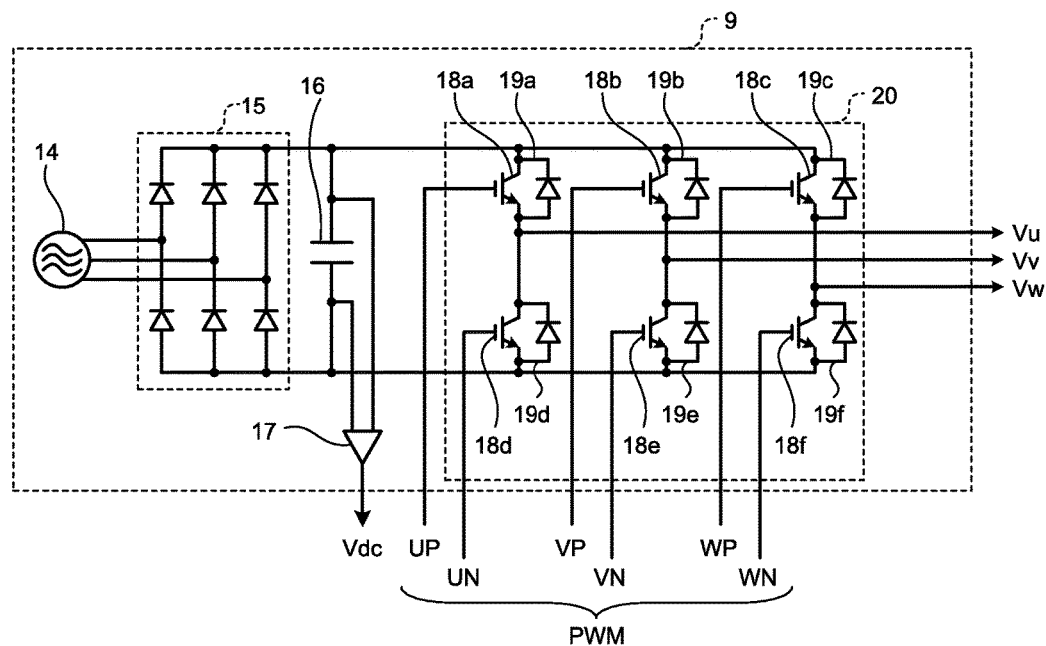
FIG. 2 is a diagram illustrating an example configuration of an inverter in the first embodiment.

FIG. 2 is a diagram illustrating an example configuration of the inverter 9 in the first embodiment. The inverter 9 includes an AC power supply 14; a rectifier 15 that rectifies the voltage supplied from the AC power supply 14; a smoothing capacitor 16 that smooths the voltage rectified by the rectifier 15 to generate a DC voltage (the bus voltage Vdc); a bus-voltage detecting unit 17 that detects the bus voltage Vdc generated by the smoothing capacitor 16 and outputs the bus voltage Vdc to the inverter control unit 10; and a voltage applying unit 20 that operates at the bus voltage Vdc that is the power-supply voltage.

The voltage applying unit 20 constitutes a bridge circuit in which series connection units each of which is obtained by connecting two switching elements in series, i.e., three series connection units including a pair of switching elements 18a and 18d, a pair of switching elements 18b and 18e, and a pair of switching elements 18c and 18f are connected in parallel. The switching elements 18a, 18b, 18c, 18d, 18e, and 18f are respectively provided with reflux diodes 19a, 19b, 19c, 19d, 19e, and 19f connected in anti-parallel, i.e., connected such that the directions in which currents flow are opposite.

The voltage applying unit 20 controls the switching elements respectively corresponding to the PWM signals UP, VP, WP, UN, VN, and WN transmitted from the inverter control unit 10 in accordance with the PWM signals UP, VP, WP, UN, VN, and WN. Specifically, the signal UP controls the switching element 18a, the signal VP controls the switching element 18b, the signal WP controls the switching element 18c, the signal UN controls the switching element 18d, the signal VN controls the switching element 18e, and the signal WN controls the switching element 18f. According to this control, voltages Vu, Vv, and Vw across the controlled switching elements are output and respectively applied to the U-phase, the V-phase, and the W-phase in the motor 8.

Figure 3:
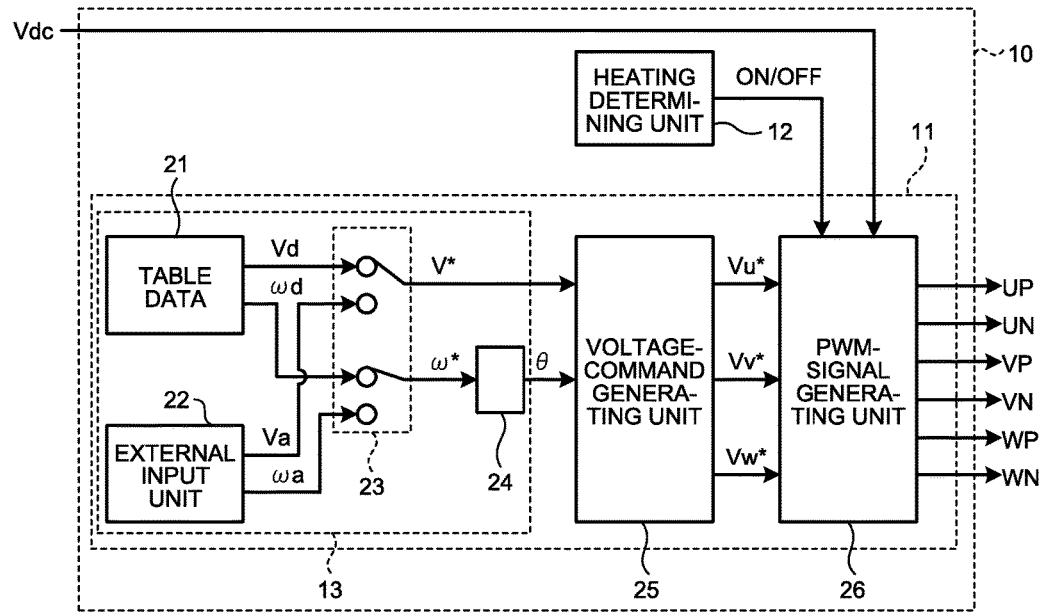
FIG. 3 is a diagram illustrating an example configuration of an inverter control unit in the first embodiment.

FIG. 3 is a diagram illustrating an example configuration of the inverter control unit 10 in the first embodiment. As described above, the inverter control unit 10 includes the high-frequency-voltage generating unit 11 and the heating determining unit 12. The heating determining unit 12 will be described later. The high-frequency-voltage generating unit 11 will be explained here.

The high-frequency-voltage generating unit 11 includes a voltage-command selecting unit 13, a voltage-command generating unit 25, and a PWM-signal generating unit 26. The voltage-command selecting unit 13 includes table data 21, an external input unit 22, a selecting unit 23, and an integrator 24.

A voltage command value Vd and a rotation-number command value $\omega d$ are recorded in the table data 21. The selecting unit 23 selects either the voltage command value Vd recorded in the table data 21 or a voltage command value Va input from the external input unit 22 as a voltage command value V* and outputs the voltage command value V*. The selecting unit 23 also selects either the rotation-number command value $\omega d$ recorded in the table data 21 or a rotation-number command value $\omega a$ input from the external input unit 22 as a rotation-number command value $\omega$*  and outputs the rotation-number command value $\omega$. The integrator 24 obtains a voltage phase $\theta$ from the rotation-number command value $\omega$* output from the selecting unit 23.

The voltage-command generating unit 25 receives the voltage command value V* and the voltage phase $\theta$ obtained by the integrator 24 as inputs to generate voltage command values Vu*, Vv*, and Vw* and outputs the voltage command values Vu*, Vv*, and Vw* to the PWM-signal generating unit 26. The PWM-signal generating unit 26 generates PWM signals UP, VP, WP, UN, VN, and WN on the basis of the voltage command values Vu*, Vv*, and Vw* generated by the voltage-command generating unit 25 and the input bus voltage Vdc and outputs the PWM signals UP, VP, WP, UN, VN, and WN to the inverter 9.

With the configuration illustrated in FIG. 3, the external input unit 22 may be configured to calculate, for example, the amount of heat required for the heating determining unit 12 and input the voltage command value Va and the rotation-number command value ωa to the external input unit 22. Even though the external input unit 22 is provided inside the inverter control unit 10 in FIG. 3, the configuration can be such that a value is input to the inverter control unit 10 from an external source.

Details of the voltage command values Vu*, Vv*, and Vw* to be generated by the voltage-command generating unit 25 and the PWM signals to be generated by the PWM-signal generating unit 26 are explained next.

Figure 4:
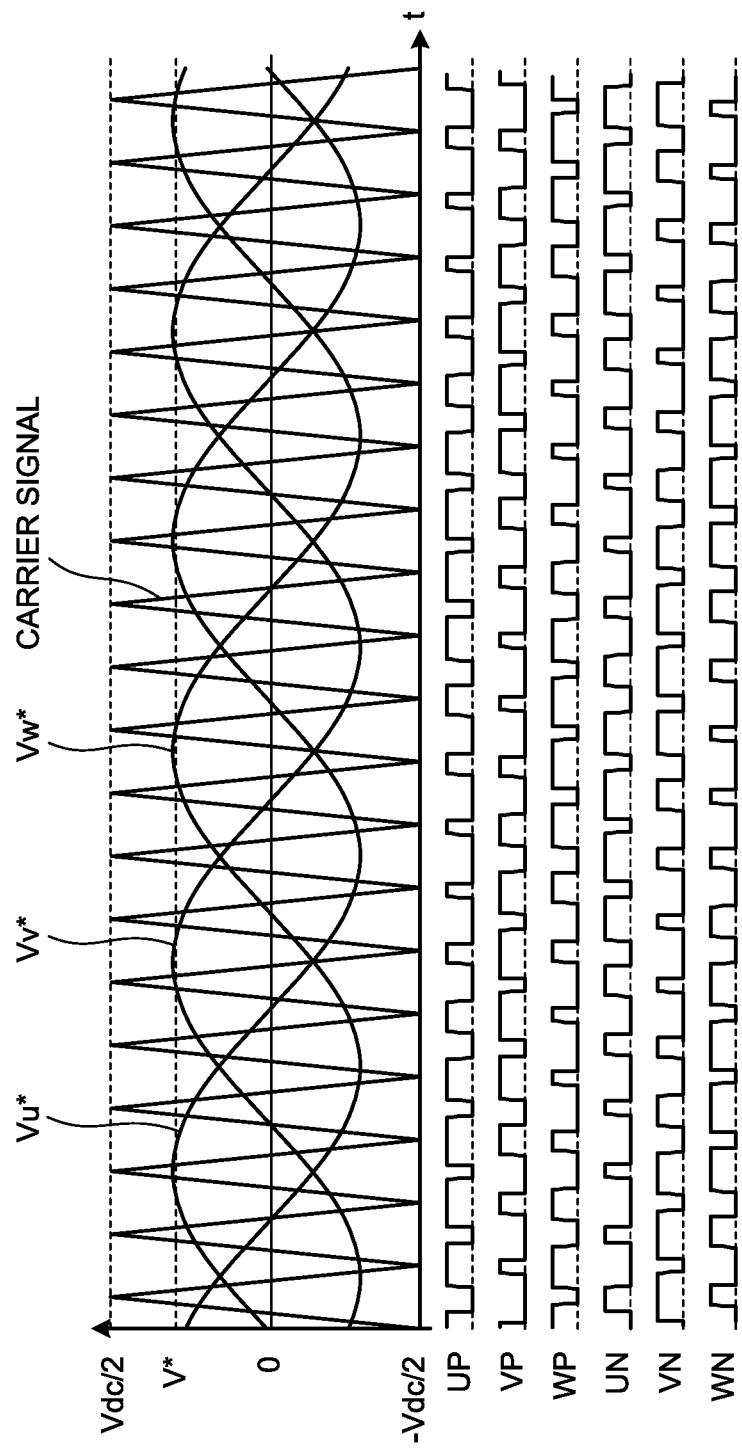
FIG. 4 is a diagram illustrating input/output waveforms of a PWM-signal generating unit in the first embodiment.

FIG. 4 is a diagram illustrating an example of input/output waveforms of the PWM-signal generating unit 26 in the first embodiment. For example, when spectrum diffusion is not performed, the voltage command values Vu*, Vv*, and Vw* are defined as cosine waves with the phases being different from one another by $2\pi/3$ as represented by the following Equations (1) to (3), where "V*" denotes an amplitude of the voltage command value, and "θ" denotes a phase of the voltage command value. Instead of the cosine wave, a sine wave may be used.

$$Vu^* = V^* \cdot \cos \theta \quad (1)$$

$$Vv^* = V^* \cdot \cos \{\theta - (2/3)\pi\} \quad (2)$$

$$Vw^* = V^* \cdot \cos \{\theta + (2/3)\pi\} \quad (3)$$

The voltage-command generating unit 25 calculates the voltage command values Vu*, Vv* and Vw* using Equations (1) to (3) on the basis of the voltage command value V* and the voltage phase θ obtained by the integrator 24 and outputs the calculated voltage command values Vu*, Vv* and Vw* to the PWM-signal generating unit 26. The PWM-signal generating unit 26 compares the voltage command values Vu*, Vv* and Vw* with a carrier signal that is a reference signal having an amplitude Vdc/2 and changing at a preset frequency and generates the PWM signals UP, VP, WP, UN, VN and WN on the basis of the relation of their magnitudes to each other.

For example, when the voltage command value Vu* is larger than the carrier signal, UP is set to a voltage for turning on the switching element 18a and UN is set to a voltage for turning off the switching element 18d. When the voltage command value Vu* is smaller than the carrier signal, conversely, UP is set to a voltage for turning off the switching element 18a and UN is set to a voltage for turning on the switching element 18d. The same applies to the other signals. Specifically, VP and VN are determined by comparing the voltage command value Vv* with the carrier signal and WP and WN are determined by comparing the voltage command value Vw* with the carrier signal.

In the case of general inverters, because a complementary PWM system is adopted, UP and UN, VP and VN, and WP and WN have an inverse relationship to each other. Therefore, there are eight switching patterns in total.

The frequency of the carrier signal illustrated in FIG. 4 is an example only, and an arbitrary frequency can be selected from set frequencies. Further, the waveform of the carrier signal is also an example only, and any waveform can be used as long as both the top and the bottom of the waveform can be identified.

FIG. 5 is a chart illustrating eight switching patterns in the first embodiment. In FIG. 5, reference symbols V0 to V7 denote voltage vectors generated in the respective switching patterns. The voltage directions of the respective voltage vectors are indicated by addition of reference symbols "±" and "0" when the voltage is not generated. Specifically, for example, "+U" means a voltage for generating a current in the U-phase direction, which flows into the motor 8 via the U-phase and flows out of the motor 8 via the V-phase and the W-phase, and "−U" means a voltage for generating a current in a direction opposite to the U phase direction, which flows into the motor 8 via the V-phase and the W-phase and flows out of the motor 8 via the U-phase. The same interpretation applies to "±V" and "±W".

A desired voltage can be applied to the inverter 9 by combining the switching patterns illustrated in FIG. 5 and outputting a voltage vector thereto. When the refrigerant in the general compressor 1 is compressed by the motor 8 in a normal operation mode, the motor 8 is generally operated at a frequency equal to or lower than 1 kilohertz. At this time, by changing the phase θ at high speed and applying a high-frequency voltage exceeding 1 kilohertz, the compressor 1 can be heated. An operation mode in which the high-frequency voltage exceeding 1 kilohertz is applied to heat the compressor 1 is often referred to as a heating operation mode.

The Equations (1) to (3) are one example for generating the voltage command values Vu*, Vv* and Vw*, and the voltage command values Vu*, Vv* and Vw* can be obtained by two-phase modulation, third harmonic superposition modulation, or space vector modulation, other than these Equations.

However, in the case of general inverters, the carrier frequency, which is the frequency of the carrier signal, has an upper limit due to the switching speed of the switching elements provided in the inverters. Therefore, it is difficult to output a high-frequency voltage having a frequency equal to or higher than the carrier frequency. In the case of general IGBTs (Insulated Gate Bipolar Transistors), the upper limit of the switching speed is about 20 kilohertz.

When the frequency of the high-frequency voltage becomes about 1/10 of the carrier frequency, adverse effects may occur such as deterioration of the waveform output accuracy of the high-frequency voltage and superposition of DC components. In view of the above, when the carrier frequency is set to 20 kilohertz, if the frequency of the high-frequency voltage is set equal to or lower than 2 kilohertz, which is 1/10 of the carrier frequency, then the frequency of the high-frequency voltage falls within the audible frequency range and therefore noise may increase.

Figure 6:
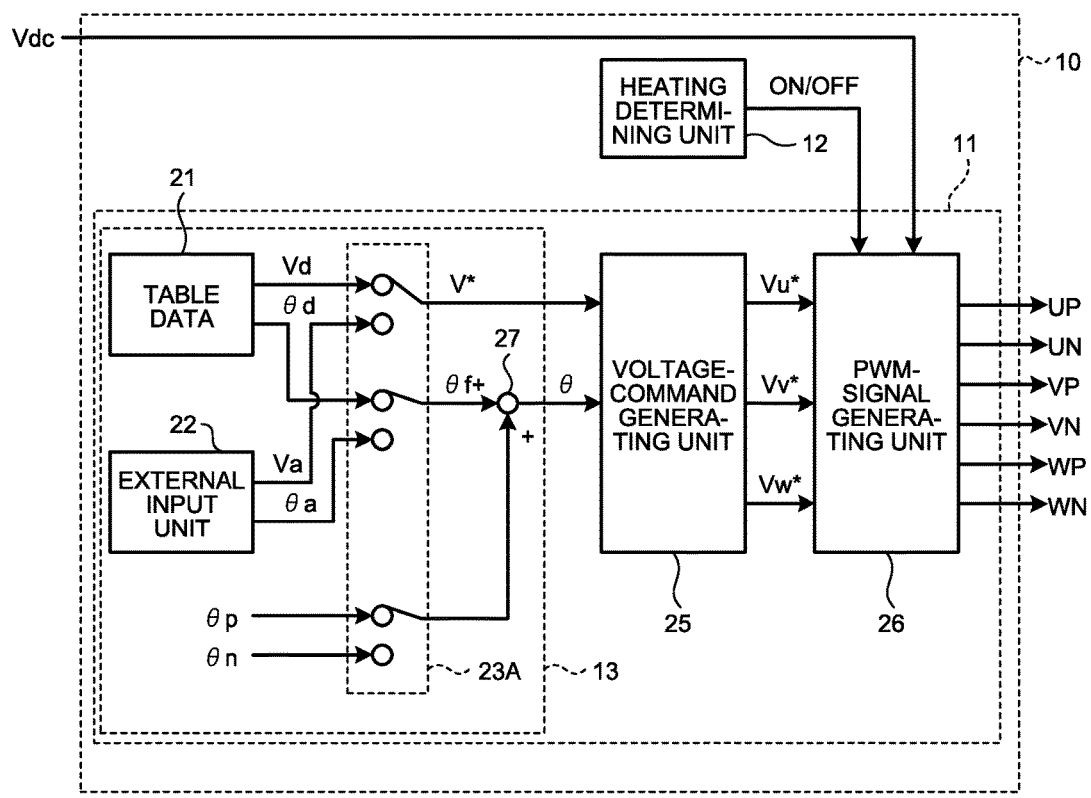
FIG. 6 is a diagram illustrating another example configuration of the inverter control unit in the first embodiment.

Therefore, in the present embodiment, the inverter control unit 10 has a configuration illustrated in FIG. 6. In the example of FIG. 6, instead of the integrator 24 provided in FIG. 3, an adder 27 that adds either a phase θp or a phase θn to a reference phase θf to obtain a voltage phase θ is provided, and a selecting unit 23A in which a function of selecting either the phase θp or the phase θn is added to the selecting unit 23 illustrated in FIG. 3 is further provided.

With the configuration of FIG. 3, the voltage phase θ is obtained by integrating the rotation-number command value ω* by the integrator 24. In contrast, with the configuration of FIG. 6, two phases, i.e., the phase θp and the phase θn, which is different from the phase θp substantially by 180 degrees, are prepared, and the selecting unit 23A, which functions also as a phase switching unit, alternately switches between the phase θp and the phase θn synchronously with the reference signal. The adder 27 adds the phase θp or the phase θn selected by the selecting unit 23A to the reference phase θf to obtain the voltage phase θ. In the description below, it is assumed that θp=0 [degrees] and θn=180 [degrees].

An operation of the inverter control unit 10 will be explained next. The selecting unit 23A alternately switches between the phase θp and the phase θn at a timing of a top, which is a peak of the carrier signal, or a bottom, which is a valley of the carrier signal, or at timings of the top and the bottom. The adder 27 adds the phase θp or the phase θn selected by the selecting unit 23A to the reference phase θf to obtain the voltage phase θ and outputs the phase θ to the voltage-command generating unit 25. The voltage-command generating unit 25 uses the voltage phase θ and the voltage command value V* to generate the voltage command values Vu*, Vv*, and Vw* on the basis of the above Equations (1) to (3) and outputs the voltage command values Vu*, Vv*, and Vw* to the PWM-signal generating unit 26.

In these series of operations, because the selecting unit 23A switches between the phase θp and the phase θn at the timing of the top or the bottom of the carrier signal or at timings of both the top and the bottom, the PWM signals synchronized with the carrier signal can be output.

Figure 7:
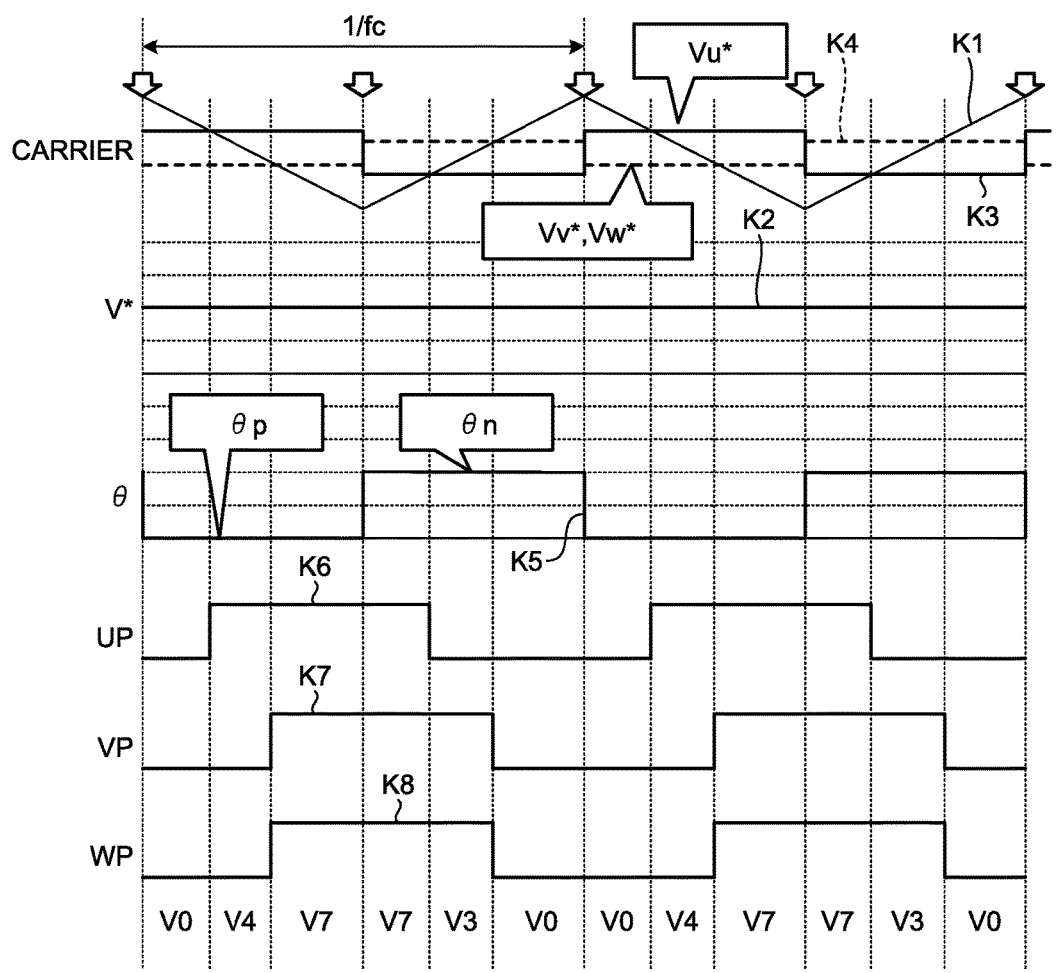
FIG. 7 is a timing chart in a case where a selecting unit alternately switches between a phase θp and a phase θn at timings of a top and a bottom of a carrier signal.

FIG. 7 is a timing chart when the selecting unit 23A alternately switches between the phase θp and the phase θn at the timings of the top and the bottom of the carrier signal. In FIG. 7, fc denotes a frequency of the carrier signal; therefore, 1/fc represents a carrier period. In FIG. 7, a waveform K1 is a waveform of the carrier signal, a waveform K2 is a waveform of the voltage command value V*, a waveform K3 is a waveform of the U-phase voltage command value Vu*, and a waveform K4 indicated by a broken line is a waveform of the V-phase voltage command value Vv* and a waveform of the W-phase voltage command value Vw*. In the example of FIG. 7, the V-phase voltage command value Vv* and the W-phase voltage command value Vw* always have the same value. Further, a waveform K5 denotes the phase θ and indicates that θp is selected when the carrier signal is directed from the top to the bottom, and θn is selected when the carrier signal is directed from the bottom to the top. Waveforms K6 to K8 respectively represent the PWM signal UP, the PWM signal VP, and the PWM signal WP.

The relationships between the PWM signal UP and the PWM signal UN, between the PWM signal VP and the PWM signal VN, and between the PWM signal WP and the PWM signal WN are each inverse in the ON state and the OFF state, and thus, when the state of one signal of each pair is known, the state of the other signal is also known. Therefore, in FIG. 7, only the PWM signal UP, the PWM signal VP, and the PWM signal WP are illustrated. Further, in FIG. 7, the reference phase θf is assumed to be 0 [degrees]. In this case, the PWM signals change as illustrated in FIG. 7. The voltage vector changes in the order of V0 (UP=VP=WP=0), V4 (UP=1, VP=WP=0), V7 (UP=VP=WP=1), V3 (UP=0, VP=WP=1), V0 (UP=VP=WP=0), and so on.

Figure 8:
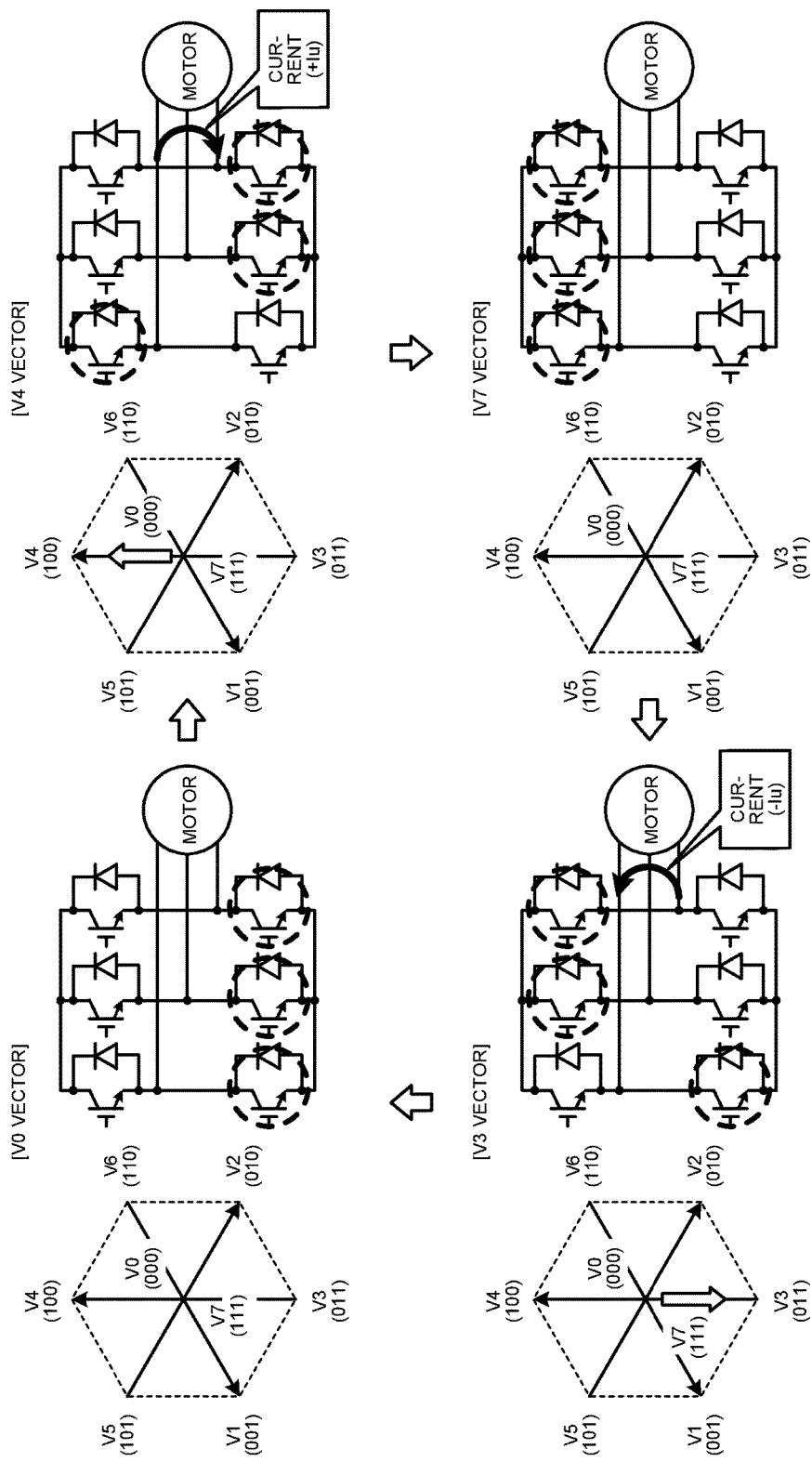
FIG. 8 is an explanatory diagram of a change of a voltage vector illustrated in FIG. 7.

FIG. 8 is an explanatory diagram of a change of the voltage vector illustrated in FIG. 7. In FIG. 8, the switching elements 18 being surrounded by broken lines are on and the switching elements 18 not being surrounded by broken lines are off.

As illustrated in FIG. 8, when the V0 vector or the V7 vector is applied, the lines of the motor 8 are short-circuited and any voltage is not output. In this case, the energy accumulated in the inductance of the motor 8 becomes a current and the current flows in the short circuit. When the V4 vector is applied, a current (current of +Iu indicated by a thick arrow in FIG. 8) in the U-phase direction, which flows into the motor 8 via the U-phase and flows out of the motor 8 via the V-phase and the W-phase, flows, and when the V3 vector is applied, a current (current of −Iu indicated by a thick arrow in FIG. 8) in the −U phase direction, which flows into the motor 8 via the V-phase and the W-phase and flows out of the motor 8 via the U-phase, flows to the windings of the motor 8. In other words, when the V4 vector is applied, a current flows to the windings of the motor 8 in the opposite direction to the case when the V3 vector is applied. Because the voltage vector changes in order of V0, V4, V7, V3, V0, and so on, the current of +Iu and the current of −Iu flow to the windings of the motor 8 alternately. In particular, as illustrated in FIG. 7, the V4 vector and the V3 vector appear during one carrier cycle (1/fc); therefore, an AC voltage synchronized with the carrier frequency fc can be applied to the windings of the motor 8.

Because the V4 vector (current of +Iu) and the V3 vector (current of −Iu) are alternately output, forward and reverse torques are switched instantaneously. Thus, the torques cancel each other out; therefore, a voltage can be applied such that vibrations of the rotor are suppressed.

Next, a case where the selecting unit 23A switches between the phase θp and the phase θn alternately only at the timing of the bottom of the carrier signal is considered. In this case, although not illustrated, the voltage vector changes in the order of V0, V4, V7, V7, V3, V0, V0, V3, V7, V7, V4, V0, and so on. Because the V4 vector and the V3 vector appear during two carrier cycles, an AC voltage having a ½ carrier frequency can be applied to the windings of the motor 8.

Figure 9:
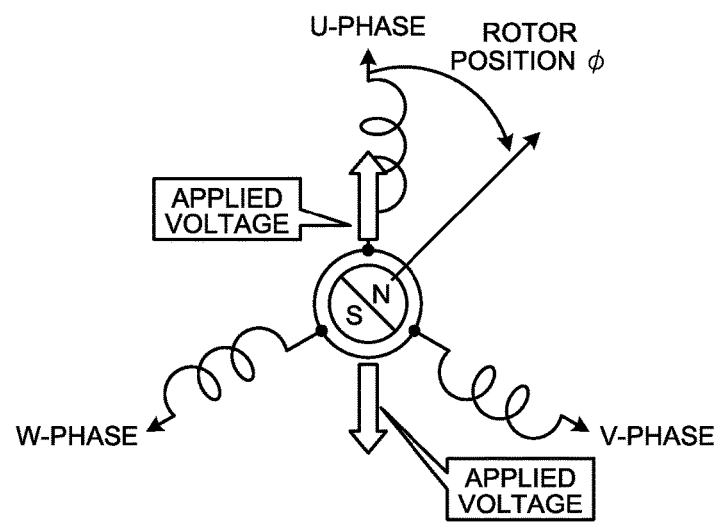
FIG. 9 is an explanatory diagram of a position of a rotor of an IPM motor.

FIG. 9 is an explanatory diagram of the position of a rotor (stop position of a rotor) of an IPM motor (Interior Permanent Magnet motor). In this embodiment, the rotor position φ of the IPM motor is indicated by the size of the angle by which the direction of the N pole of the rotor deviates from the U-phase direction.

Figure 10:
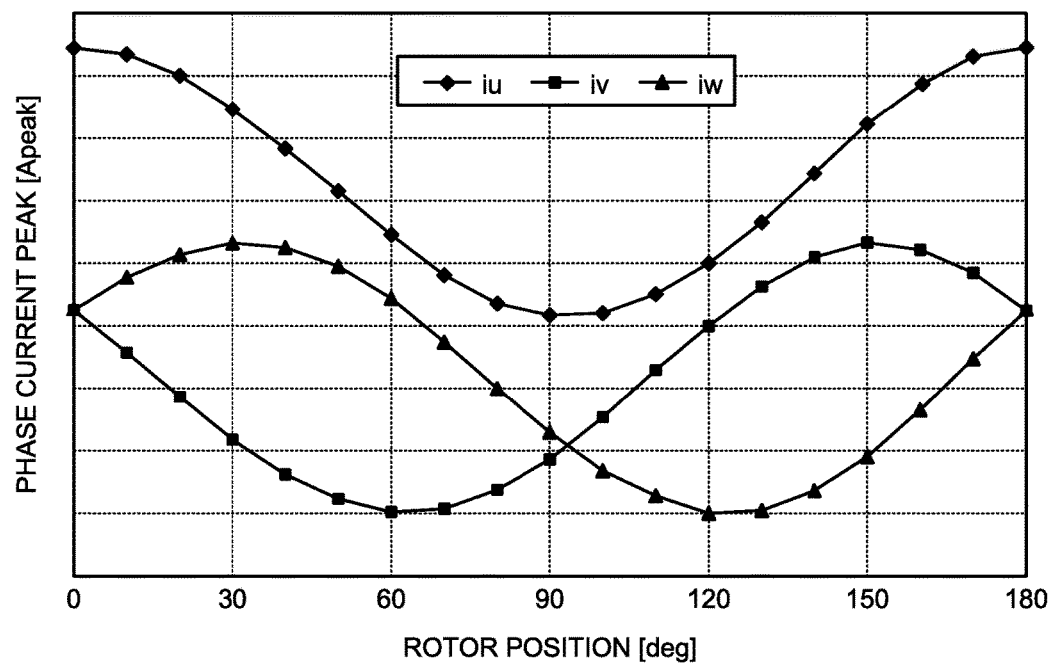
FIG. 10 is a diagram illustrating a current change depending on a rotor position.

FIG. 10 is a graph illustrating the current change depending on the rotor position. The horizontal axis indicates the rotor position, and the vertical axis indicates the phase current peak. In the case of the IMP motor, the winding inductance depends on the rotor position. Therefore, the winding impedance represented by the product of the electrical angular frequency W and the inductance value changes depending on the rotor position. Consequently, even when the same voltage is applied, the current flowing in the windings of the motor 8 changes depending on the rotor position and thus the amount of heat changes. As a result, a large amount of electric power may be consumed to obtain the necessary amount of heat depending on the rotor position. Therefore, the reference phase θf is changed over time so as to evenly apply the voltage to the rotor.

Figure 11:
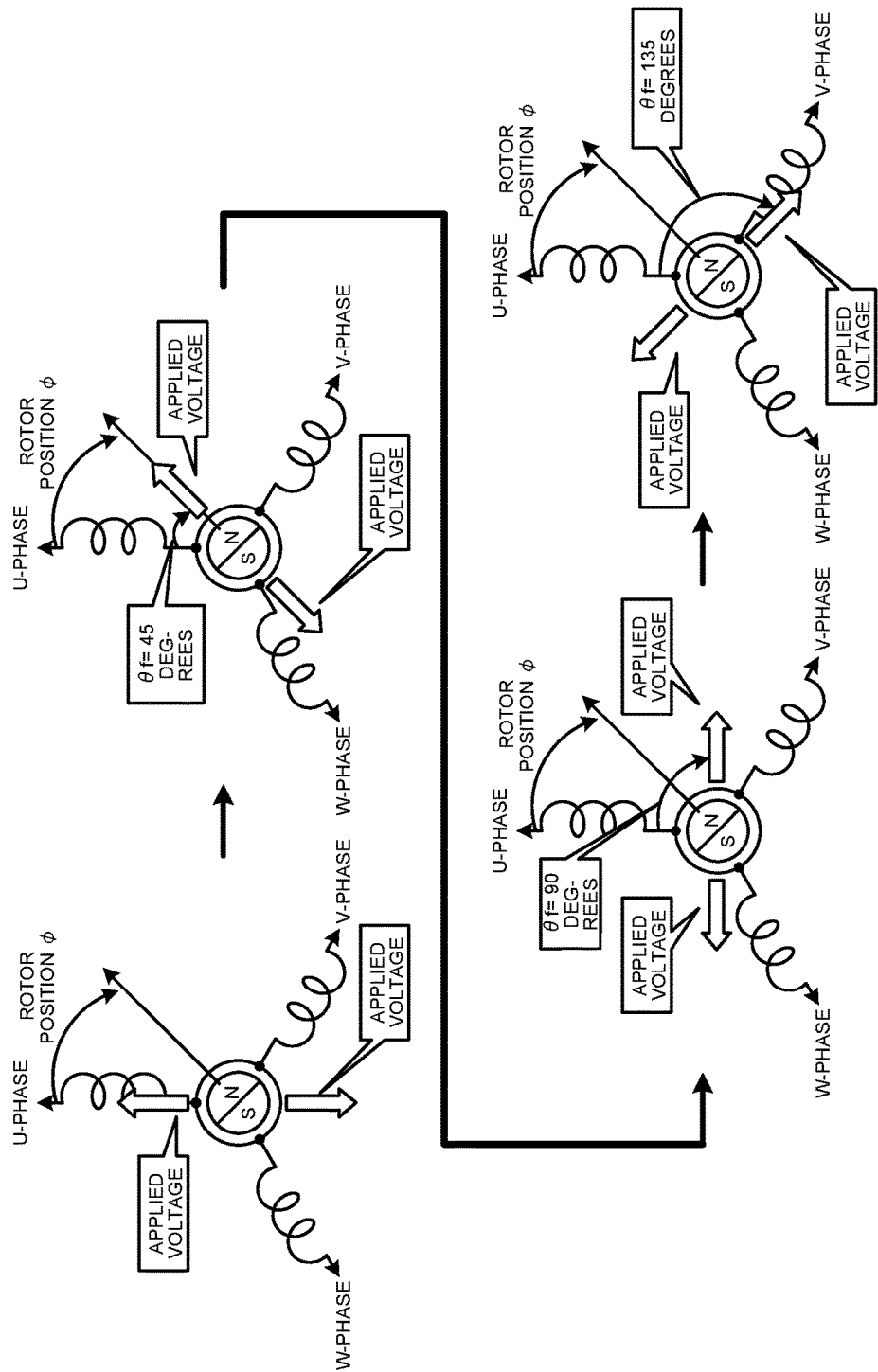
FIG. 11 is a diagram illustrating applied voltages when θf is changed over time.

FIG. 11 is a diagram illustrating applied voltages when the reference phase θf is changed over time. In this embodiment, the reference phase θf is changed over time in increments of 45 degrees, i.e., 0 degrees, 45 degrees, 90 degrees, 135 degrees, and so on, based on the U-phase as a reference.

When the reference phase θf is 0 degrees, the phase θ of the voltage command value is 0 degrees or 180 degrees. When the reference phase θf is 45 degrees, the phase θ of the voltage command value is 45 degrees or 225 degrees. When the reference phase θf is 90 degrees, the phase θ of the voltage command value is 90 degrees or 270 degrees. When the reference phase θf is 135 degrees, the phase θ of the voltage command value is 135 degrees or 315 degrees. In other words, the reference phase θf is initially set to 0 degrees, and the phase θ of the voltage command value is switched between 0 degrees and 180 degrees in synchronization with the carrier signal for a first period of time. Thereafter, the reference phase θf is switched to 45 degrees, and the phase θ of the voltage command value is switched between 45 degrees and 225 degrees in synchronization with the carrier signal for a second period of time. Subsequently, the reference phase θf is switched to 90 degrees, and so on. In this manner, the phase θ of the voltage command value is switched between 0 degrees and 180 degrees, between 45 degrees and 225 degrees, between 90 degrees and 270 degrees, between 135 degrees and 315 degrees, and so on for each set period of time.

According to the control operation described above, because the energization phase of the high-frequency AC voltage can be changed over time and it is possible to eliminate the effect of the inductance characteristics caused by the rotor stop position. Thus, the compressor 1 can be uniformly heated regardless of the rotor position.

Figure 12:
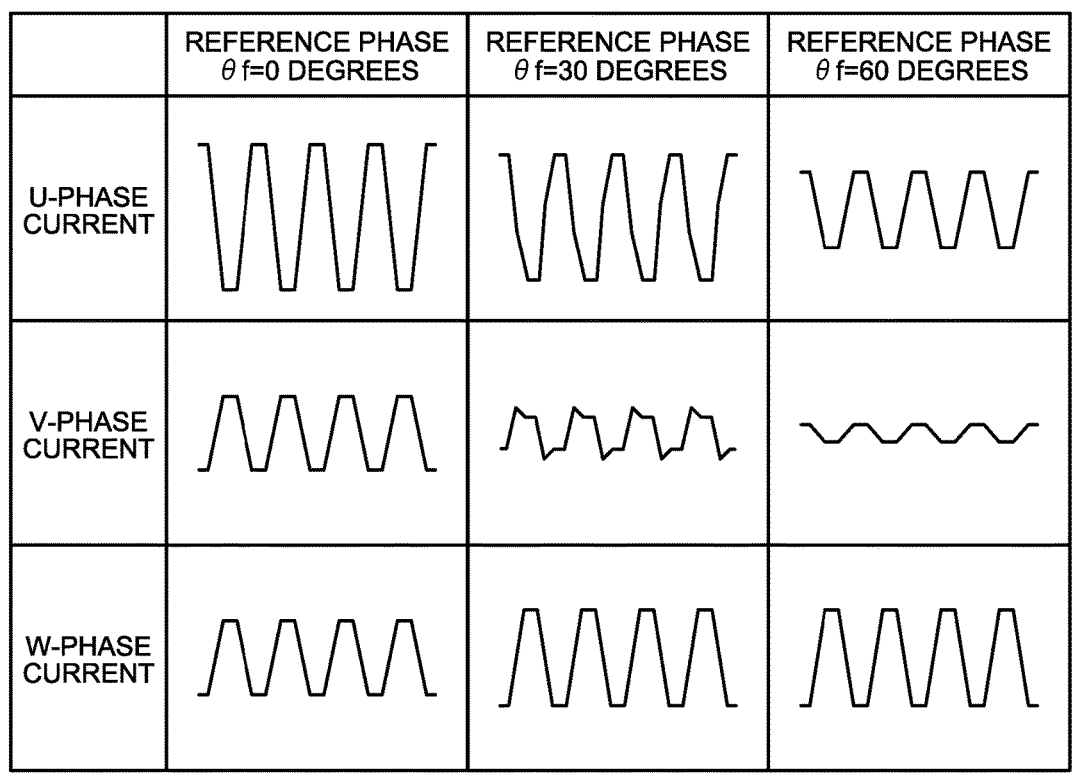
FIG. 12 is a diagram illustrating a current flowing to U-, V-, and W-phases of a motor when θf is 0 degrees, 30 degrees, and 60 degrees.

FIG. 12 is a diagram illustrating a current flowing to the respective U-, V- and W-phases of the motor 8 when the reference phase θf is 0 degrees, 30 degrees, and 60 degrees. The reference phase θf is based on the U-phase, as in the case of FIG. 11, that is, the direction of V4 is set to 0 degrees.

In FIG. 12, when the reference phase θf is 0 degrees, the current waveform becomes a trapezoidal shape, and thus the current has a small number of harmonic components. This is because, as illustrated in FIG. 7, only one other voltage vector is generated between V0 and V7. The other voltage vector refers to a voltage vector (in FIG. 7, V4 corresponds thereto) with which, among the switching elements 18a to 18f, one switching element on the positive voltage side and two switching elements on the negative voltage side are on, or a voltage vector (in FIG. 7, V3 corresponds thereto) with which two switching elements on the positive voltage side and one switching element on the negative voltage side are on, which is generated only once.

When the reference phase θf is 60 degrees, as in the case of the reference phase θf being 0 degrees, only one other voltage vector is generated between V0 and V7. Also in this case, the current waveform becomes a trapezoidal shape and thus the current has a small number of harmonic components.

However, when the reference phase θf is 30 degrees, two different voltage vectors are generated between V0 and V7. In such a case, as illustrated in FIG. 12, the current waveform is distorted and thus the current has a large number of harmonic components. The distortion of the current waveform may cause adverse effects, such as motor noise and motor shaft vibration.

The characteristics described above are the same in the case of other values. Therefore, when the reference phase θf is n (n is an integer of 0 or larger) multiples of 60 degrees, the voltage phase θ becomes a multiple of 60 degrees (in this example, θp=0 [degrees] and θn=180 [degrees]); therefore, only one other voltage vector is generated between V0 and V7. In contrast, when the reference phase θf is not n multiples of 60 degrees, the voltage phase θ does not become a multiple of 60 degrees; therefore, two other voltage vectors are generated between V0 and V7. If two other voltage vectors are generated between V0 and V7, the current waveform is distorted and the current has a large number of harmonic components. Consequently, the current waveform may cause adverse effects, such as motor noise and motor shaft vibration. Therefore, it is desirable that the reference phase θf is changed in increments of 60 degrees, such as 0 degrees, 60 degrees, and so on.

Figure 13:
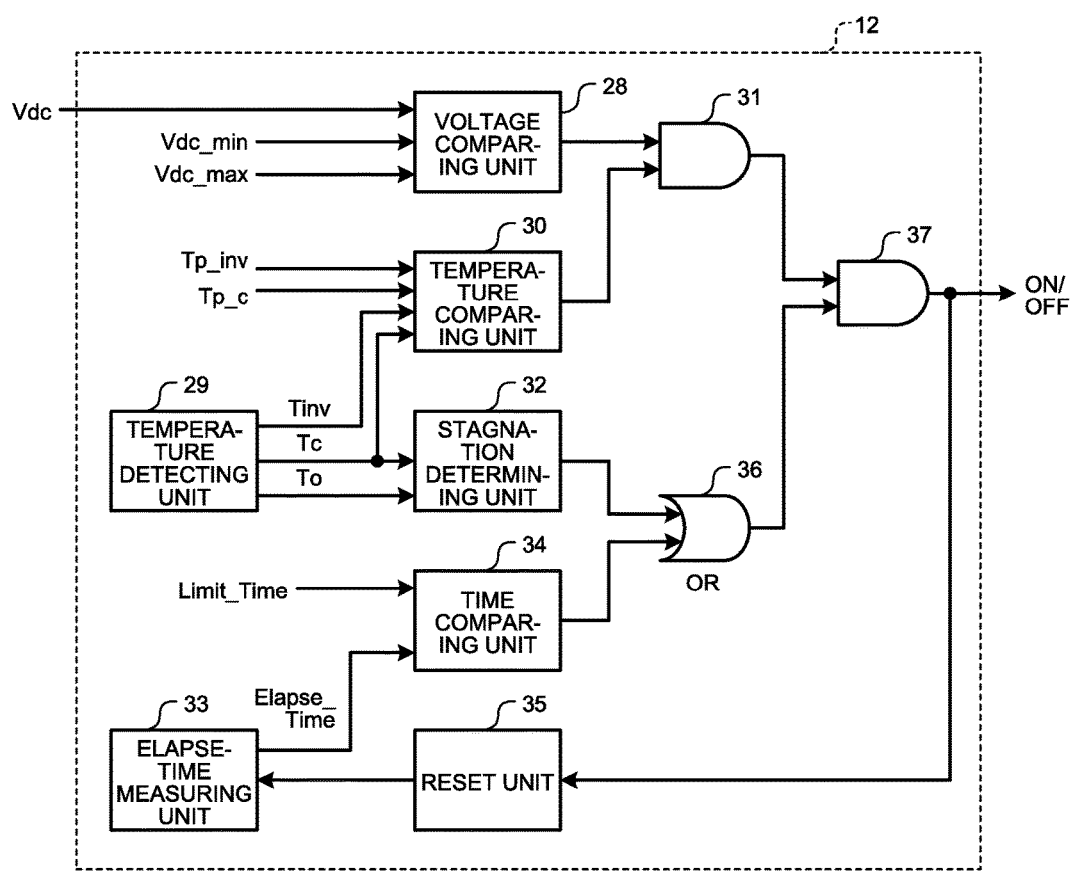
FIG. 13 is a diagram illustrating a configuration of a heating determining unit.

Next, the heating determining unit 12 will be explained. FIG. 13 is a diagram illustrating a configuration of the heating determining unit 12 in the first embodiment. The heating determining unit 12 controls the operation condition of the high-frequency-voltage generating unit 11, i.e., controls whether to operate the high-frequency-voltage generating unit 11 (on or off), on the basis of the bus voltage Vdc detected by the bus-voltage detecting unit 17 of the inverter 9.

The heating determining unit 12 includes a voltage comparing unit 28, a temperature detecting unit 29, a temperature comparing unit 30, a first AND operation unit 31, a stagnation determining unit 32, an elapse-time measuring unit 33, a time comparing unit 34, a reset unit 35, an OR operation unit 36, and a second AND operation unit 37.

When the bus voltage Vdc detected by the bus-voltage detecting unit 17 satisfies Vdc_min<Vdc<Vdc_max, the voltage comparing unit 28 determines that the bus voltage Vdc is normal and outputs "1", and, in other cases, the voltage comparing unit 28 outputs "0". The Vdc_max denotes an upper limit of the bus voltage, and the Vdc_min denotes a lower limit of the bus voltage. When the bus voltage is too large such that it is equal to or larger than the Vdc_max or when the bus voltage is too small such that it is equal to or smaller than Vdc_min, the voltage comparing unit 28 determines that the bus voltage Vdc is abnormal and outputs 0, thereby an operation to stop heating is performed.

The temperature detecting unit 29 detects an inverter temperature Tinv, which is the temperature of the voltage applying unit 20, a temperature Tc (hereinafter, "compressor temperature") of the compressor 1, and an outside temperature To.

The temperature comparing unit 30 compares the inverter temperature Tinv with a preset protection temperature Tp_inv of the inverter, and compares the compressor temperature Tc with a preset protection temperature Tp_c of the compressor 1. In a state where Tp_inv>Tinv and Tp_c>Tc are satisfied, the temperature comparing unit 30 determines that the heat pump is operating normally and outputs 1, and, in other cases, the temperature comparing unit 30 outputs 0. When Tp_inv<Tinv, the inverter temperature is high, and when Tp_c<Tc, the winding temperature of the motor 8 in the compressor 1 is high and therefore an insulation failure or the like may occur. Therefore, the temperature comparing unit 30 determines that the situation is hazardous, and outputs "0" in order that an operation to stop heating is performed. It is necessary to set the Tp_c while taking into consideration that the compressor 1 has a larger thermal capacity than the windings of the motor 8 and that the temperature rise rate thereof is slower than that of the windings.

The first AND operation unit 31 outputs the result of performing an AND operation on the output values of the voltage comparing unit 28 and the temperature comparing unit 30. When either one of the output values of the voltage comparing unit 28 and the temperature comparing unit 30 becomes "0" that indicates an abnormal state, the first AND operation unit 31 outputs 0 in order that an operation to stop heating is performed.

A method of using the bus voltage Vdc, the temperature Tinv, and the compressor temperature Tc to stop heating has been described. However, not all of these values need to be used. Needless to say, the configuration may be such that heating is stopped by using a parameter other than these values described above.

Subsequently, the stagnation determining unit 32 determines whether a liquid refrigerant is stagnated in the compressor 1 on the basis of the compressor temperature Tc and the outside temperature To detected by the temperature detecting unit 29.

The compressor 1 has the largest thermal capacity in the refrigeration cycle, and the compressor temperature Tc rises more slowly than the outside temperature To rises; therefore, the temperature of the compressor 1 becomes the lowest. A refrigerant has such a property that it stagnates in a place where the temperature is the lowest in the refrigeration cycle and accumulates as a liquid refrigerant. Therefore, the refrigerant is likely to accumulate in the compressor 1 at the time of a rise in temperature. Accordingly, the stagnation determining unit 32 determines that the refrigerant stagnates in the compressor 1 and outputs "1" to start heating when To>Tc, and stops heating when To<Tc. The control can be executed such that heating is started when To is rising or when Tc is rising. This enables the control to be executed using either one of these values when detection of Tc or To becomes difficult, and thus highly reliable control can be realized.

If both the compressor temperature Tc and the outside temperature To cannot be detected, there is a risk that heating of the compressor 1 cannot be performed. Therefore, the elapse-time measuring unit 33 measures the time (Elapse_Time) during which the compressor 1 is not heated and outputs "1" so that heating of the compressor 1 is started when the Elapse_Time has exceeded a time limit Limit_Time preset by the time comparing unit 34. The temperature change in one day is such that the temperature rises from the morning when the sun rises toward noon, and drops from when the sun sets into the night. Therefore, a temperature rise and drop is repeated with a period of about 12 hours. Accordingly, for example, it is sufficient to set the Limit_Time to about 12 hours. As for the Elapse_Time, for example, it is sufficient that the Elapse_Time is set to "0" by the reset unit 35 when heating of the compressor 1 has been performed.

The OR operation unit 36 outputs the result of performing an OR operation on the output values of the stagnation determining unit 32 and the time comparing unit 34. When either one of the output values of the stagnation determining unit 32 and the time comparing unit 34 becomes "1" that indicates the start of heating, the OR operation unit 36 outputs "1" so that heating of the compressor 1 is started.

The second AND operation unit 37 outputs the result of performing an AND operation on the output values of the first AND operation unit 31 and the OR operation unit 36 as an output value of the heating determining unit 12. When the output value is "1", the output value becomes an ON signal (ON) so that the high-frequency-voltage generating unit 11 is operated and thus the heating operation of the compressor 1 is performed. In contrast, when the output value is "0", the output value becomes an OFF signal (OFF) so that the high-frequency-voltage generating unit 11 is not operated. Accordingly, the heating operation of the compressor 1 is not performed, or the operation of the high-frequency-voltage generating unit 11 is stopped and thus the heating operation of the compressor 1 is not performed.

With the configuration of FIG. 13, the second AND operation unit 37 outputs the result of an AND operation. Therefore, when the signal "0" that indicates the stop of heating of the compressor 1 is output from the first AND operation unit 31, heating can be stopped even if the OR operation unit 36 outputs the signal "1" that indicates the start of heating. Accordingly, it is possible to obtain a heat pump device that can minimize power consumption while it is idle while ensuring reliability.

The stagnation determining unit 32 can detect the amount of liquid refrigerant stagnated in the compressor 1 on the basis of the compressor temperature Tc and the outside temperature To. Accordingly, by calculating the amount of heat or electric power necessary for discharging the refrigerant to the outside of the compressor 1 in accordance with the detected amount of liquid refrigerant and operating the high-frequency-voltage generating unit 11 so as to perform the requisite minimum heating, the effect on global warming can be reduced by reducing the power consumption.

A description will be given next of a desired value of the reference phase θf. FIG. 14 is a diagram illustrating twelve switching patterns obtained by adding four new switching patterns to the eight switching patterns illustrated in FIG. 5. In FIG. 14, four switching patterns denoted by reference symbols V0', V7', V0'', and V7'' are added to the switching patterns V0 to V7 illustrated in FIG. 5. Specifically, V0' denotes a switching pattern in which UN in V0 is changed from "1" to "0". Other switching patterns will be explained in a similar manner. V7' denotes a switching pattern in which UP in V7 is changed from "1" to "0"; V7'' denotes a switching pattern in which VP and WP in V7 are changed from "1" to "0"; and V0'' denotes a switching pattern in which VN and WN in V0 are changed from "1" to "0". The switching patterns V0', V7', V0'', and V7'' are output during a dead time period. During the dead time period, energy accumulated in the winding inductance of the motor flows back in the inverter 9 or is regenerated toward the power supply side of the inverter 9. Therefore, the voltage direction determined by using the switching patterns V0', V7', V0'', and V7'' is indefinite, i.e., the voltage value is unknown.

Figure 15:
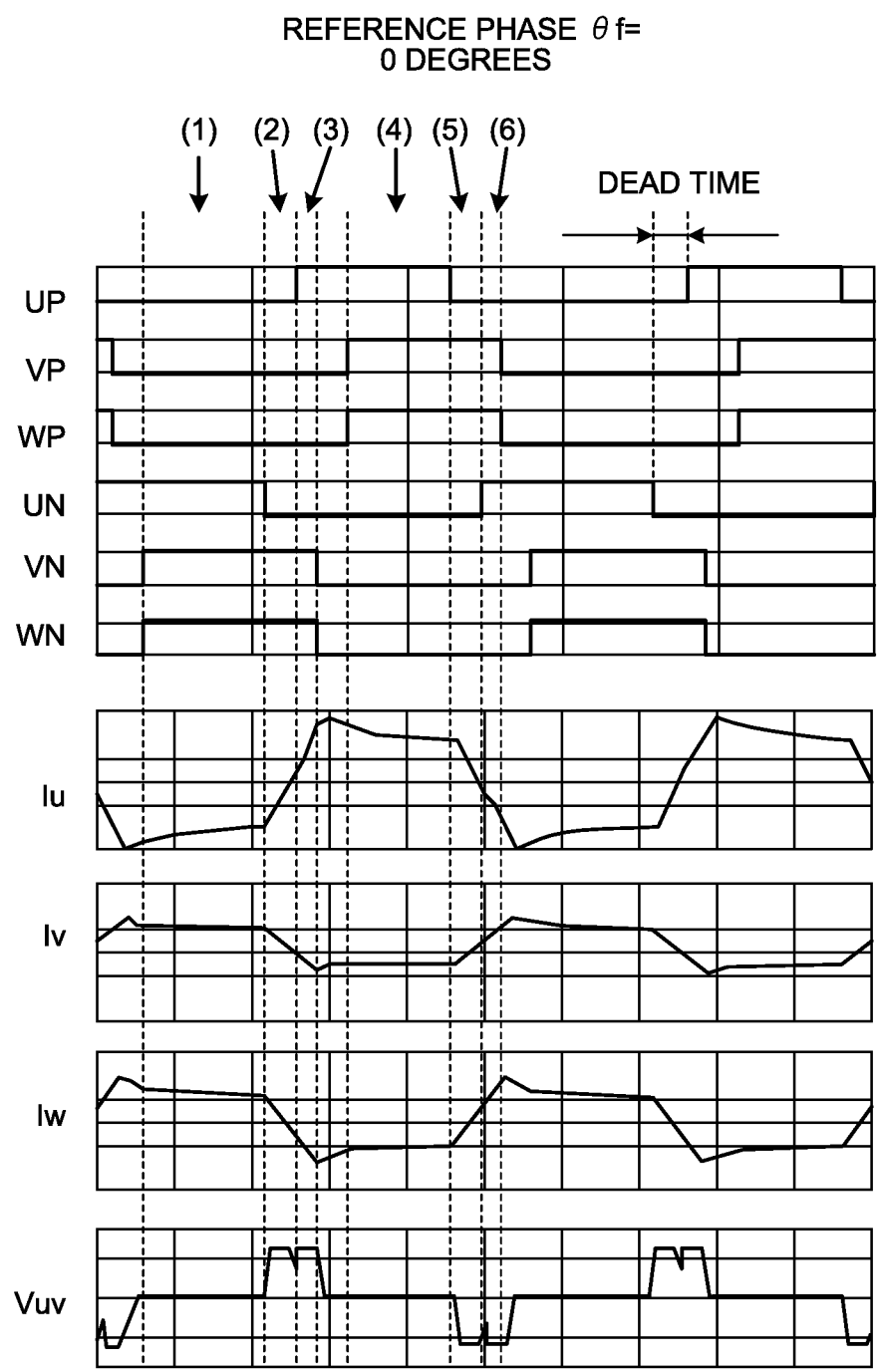
FIG. 15 is a diagram illustrating operation waveforms in the case of a reference phase θf=0 degrees.
Figure 16:
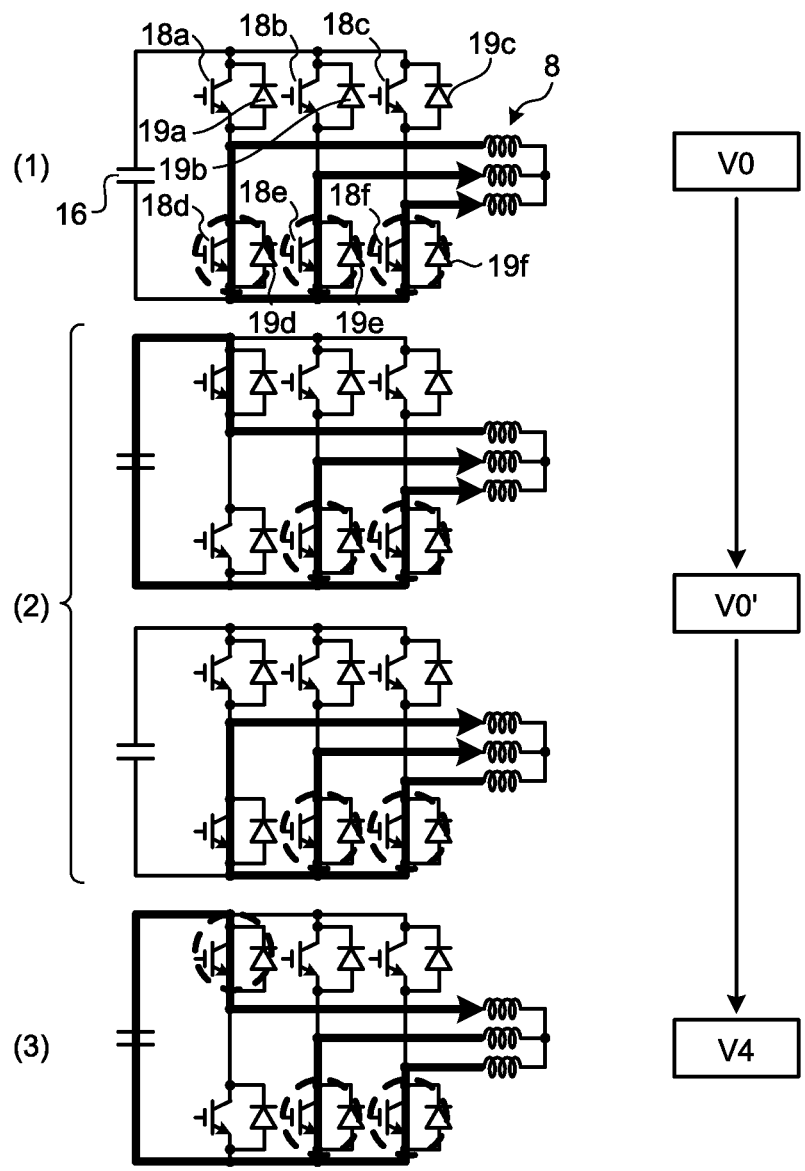
FIG. 16 is a diagram illustrating an operation of the inverter in the case of the reference phase θf=0 degrees.

FIG. 15 is a diagram illustrating operation waveforms in the case of the reference phase θf=0 degrees, where the horizontal axis indicates the time, and the vertical axis indicates respective operation waveforms of the PWM signals UP, VP, WP, UN, VN, and WN, currents Iu, Iv, and Iw of the respective U-, V-, and W-phases, and a U-V line voltage Vuv from the top. FIG. 16 is a diagram illustrating an operation of the inverter 9 in the case of the reference phase θf=0 degrees. When the inverter 9 is actually operated, the dead time illustrated in FIG. 15 is generally provided so that, among the switching elements 18a, 18b, and 18c connected to the positive voltage side and the switching elements 18d, 18e, and 18f connected to the negative voltage side, serially connected switching elements (the switching element 18a and the switching element 18d, the switching element 18b and the switching element 18e, and the switching element 18c and the switching element 18f in the configuration of FIG. 2) do not enter an ON state at the same time.

In the case of the reference phase θf=0 degrees, a section (1) in FIG. 15 corresponds to V0 in FIG. 14, and the energy accumulated in the windings of the motor 8 is returned via the switching element 18d and the reflux diodes 19e and 19f as illustrated in FIG. 16(1); therefore, the current attenuates with a time constant determined by the resistance and the inductance of the windings of the motor 8. Next, a section (2) in FIG. 15 corresponds to V0' in FIG. 14. In this case, because the switching element 18d becomes off, the mode is changed to a regenerative mode in which the energy is regenerated in the smoothing capacitor 16 via the reflux diode 19a (an upper diagram in FIG. 16(2)). When the currents of the respective phases become zero in the middle, the regenerative mode ends, and the mode shifts to a reflux mode without current flowing via the smoothing capacitor 16 (a lower diagram in FIG. 16(2)). A section (3) in FIG. 15 corresponds to V4 in FIG. 14, and the current flow becomes such that the +U-phase voltage is output.

As for the operations in sections (4), (5), and (6) in FIG. 15, illustration of the operation of the inverter 9 as illustrated in FIG. 16 is omitted. However, the basic operation is the same or equivalent except that transition of the voltage vector becomes V7→V7'→V3 and that the direction of the current is reversed.

Figure 17:
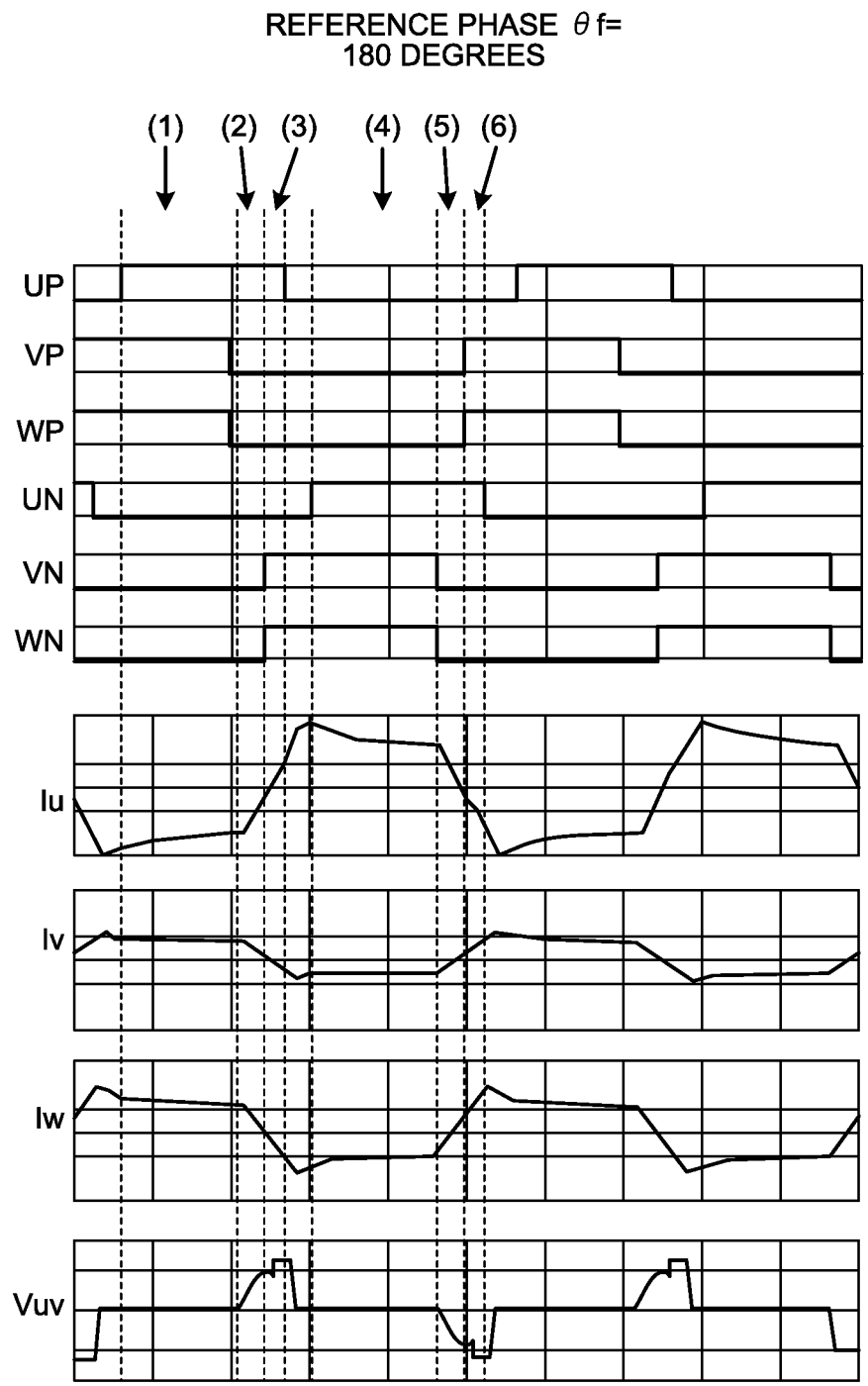
FIG. 17 is a diagram illustrating operation waveforms in the case of the reference phase θf=180 degrees.
Figure 18:
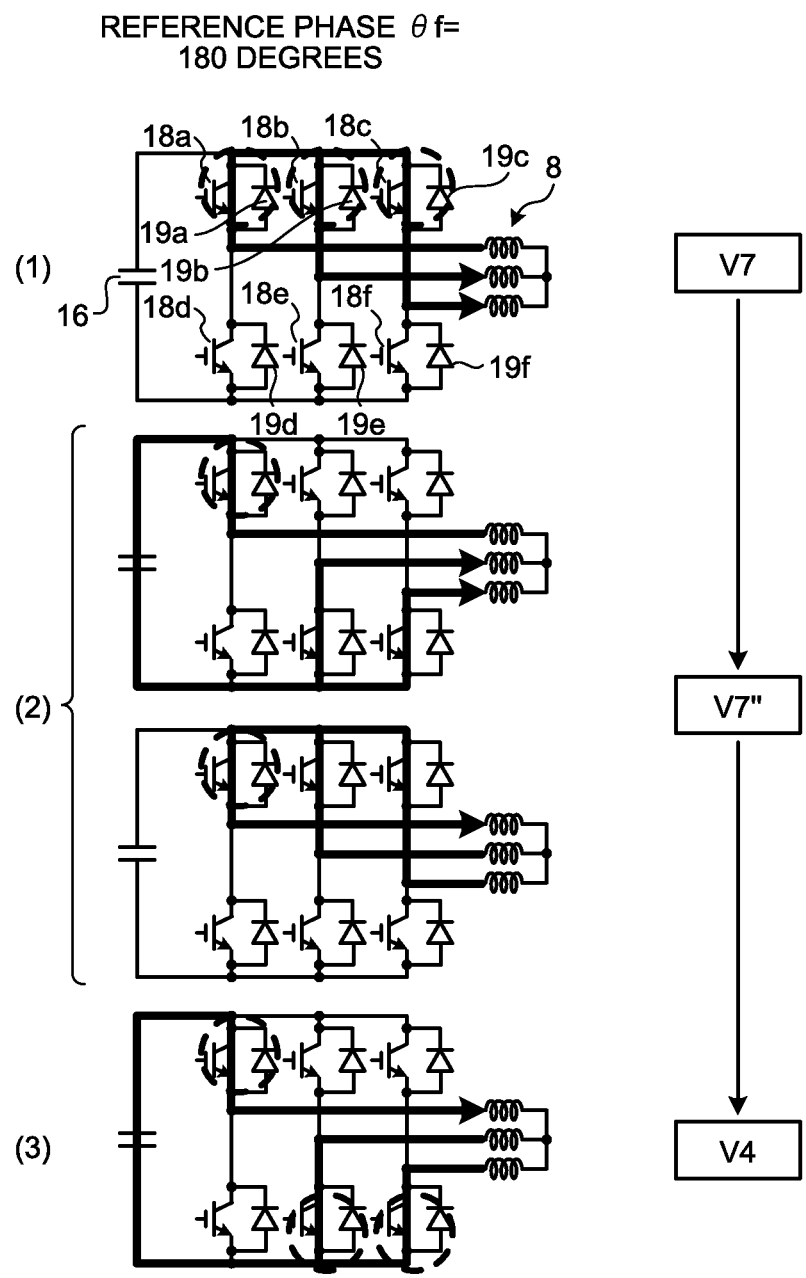
FIG. 18 is a diagram illustrating an operation of the inverter in the case of the reference phase θf=180 degrees.

A description will be given next of a case where the reference phase θf is 180 degrees. FIG. 17 is a diagram illustrating operation waveforms in the case of the reference phase θf=180 degrees. As in FIG. 15, respective operation waveforms of the PWM signals UP, VP, WP, UN, VN, and WN, the currents Iu, Iv, and Iw of the respective U-, V-, and W-phases, and the U-V line voltage Vuv are illustrated from the top. FIG. 18 is a diagram illustrating an operation of the inverter 9 in the case of the reference phase θf=180 degrees.

In the case of the reference phase θf=180 degrees, a section (1) in FIG. 17 corresponds to V7 in FIG. 14, and the energy accumulated in the windings of the motor 8 is returned via the reflux diode 19a and the switching elements 18b and 18c as illustrated in FIG. 18(1); therefore, the current attenuates with a time constant determined by the resistance and the inductance of the windings of the motor 8. Next, a section (2) in FIG. 17 corresponds to V7" in FIG. 14. In this case, because the switching elements 18b and 18c are off, the mode becomes a regenerative mode in which the energy is regenerated in the smoothing capacitor 16 via the reflux diodes 19e and 19f (an upper diagram in FIG. 18(2)). When the currents of the respective phases become zero in the middle, the regenerative mode ends, and the mode shifts to the reflux mode without current flowing via the smoothing capacitor 16 (a lower diagram in FIG. 18(2)). A section (3) in FIG. 17 corresponds to V4 in FIG. 14, and the current flow becomes such that the +U-phase voltage is output.

As for the operations in sections (4), (5), and (6) in FIG. 17, illustration of the operation of the inverter 9 as illustrated in FIG. 18 is omitted. However, the basic operation is the same or equivalent except that transition of the voltage vector becomes V0→V0"→V3 and that the direction of the current is reversed.

The behaviors in the case of the reference phase θf=0 degrees and in the case of the reference phase θf=180 degrees are considered here. In both cases, the directions of the output voltages are the same; however, the behaviors of the U-V voltages Vuv in the dead time section are different as illustrated in FIG. 15 and FIG. 17. In particular, in the case of the reference phase θf=180 degrees, the rate of voltage change over time dV/dt can be reduced. The reason for the changes in "dV/dt" is explained below.

In (1) in the case of the reference phase θf=0 degrees ((1) in FIGS. 15 and 16), the current Iu flowing to the switching element 18d is the sum of the currents Iv and Iw flowing to the reflux diodes 19e and 19f. When the switching element 18d is changed from this state to the off state, the time until the switching element 18d to which a larger current is flowing is transitioned to the off state is short, and the mode is quickly changed to the regenerative mode of (2). Because the U-, V-, and W-phases all have a potential on the negative voltage side in the state of (1), no voltage is generated in the respective U-, V-, and W-phases. However, because the U-phase is connected to the positive voltage side via the reflux diode 19a in the regenerative mode of (2), a potential difference is generated between the U-phase and the V-phase and the W-phase connected to the negative voltage side, and the U-V voltage is generated as illustrated in FIG. 15. The increased voltage drops once because the mode is shifted from the regenerative mode to the reflux mode in (2), and thereafter, the +U-phase voltage is output in (3) and thus the voltage rises again.

In contrast, in (1) in the case of the reference phase θf=180 degrees ((1) in 17 and 18), the current Iu flowing to the reflux diode 19a is the sum of the currents Iv and Iw flowing to the switching elements 18b and 18c. When the switching elements 18b and 18c are changed from this state to the off state, it takes a long time until the switching elements 18b and 18c to which the current is flowing in split-flow are transitioned to the off state, and thereafter the mode is changed to the regenerative mode of (2). Because the U-, V-, and W-phases all have a potential on the positive voltage side in the state of (1), no voltage is generated in the respective U-, V-, and W-phases. However, because the V-phase and the W-phase are connected to the negative voltage side via the reflux diodes 19e and 19f in the regenerative mode of (2), a potential difference is generated between the U-phase and the V-phase and the W-phase connected to the negative voltage side, and a U-V voltage is generated as illustrated in FIG. 17. In the case of θf=180 degrees, because dV/dt is small, the mode shifts to the reflux mode of (2) (the lower side in FIG. 18(2)) without the increased voltage reaching the maximum value, and thereafter, the +U-phase voltage is output in (3) and thus the voltage rises again.

In other words, as indicated in the case of θf=180 degrees, at the time of shifting from V0 and V7 illustrated in FIG. 14 to the dead time, by gradually shifting the mode to the regenerative mode by using a PWM pattern in which two switching elements to which the current flows in the same direction are turned off and thereafter outputting, for example, the vector V3 or V4 that outputs the voltage, a rapid change of the voltage at the time of shifting to V3 or V4 can be suppressed.

The above operation is explained by using new voltage vectors defined in FIG. 14. For example, when V4, which is the +U-phase vector, is to be output, at the time of passing the dead time section, control is executed, not in a vector transition of V0→V0'→V4, but in a vector transition of V7→V7"→V4, whereby a rapid change of the voltage at the time of shifting to V4 can be suppressed. Further, for example, when V3, which is the −U-phase vector, is to be output, at the time of passing the dead time section, control is executed, not in a vector transition of V7→V7'→V3, but in a vector transition of V0→V0"÷V3, whereby a rapid change of the voltage at the time of shifting to V3 can be suppressed.

When a rapid change of the voltage is suppressed by executing the above control, the high-frequency components of the voltage are reduced so as to suppress the generation of high-frequency noise. Accordingly, a highly reliable heat pump device that can realize cost reduction by downsizing of a noise filter and that suppresses a leak current due to the stray capacitance can be realized.

An effect obtained by setting the reference phase θf to 180 degrees is explained from the standpoint of input power to the motor 8. Input power P to the motor 8 is represented by the following Equation (4) by using a two-wattmeter method, where the U-phase current is denoted by Iu, the W-phase current is denoted by Iw, the U-V voltage is denoted by Vuv, and a W-V voltage is denoted by Vwv.

$$P = Vuv*Iu + Vwv*Iw \qquad (4)$$

Here, in the case of the reference phase θf=0 degrees, the polarities of Vuv and Iu are opposite in the section (2), and thus the product of Vuv and Iu in Equation (4) becomes negative electric power; therefore, the input power to the motor 8 decreases. Meanwhile, in the case of the reference phase θf=180 degrees, the rise of the U-V voltage is slow as described above, and the product of Vuv and Iu in the section (2) becomes small; therefore, the amount of generation of negative electric power can be suppressed. Accordingly, more electric power can be supplied to the motor 8; therefore, the compressor 1 can be prevented from being damaged by reliably heating and vaporizing the liquid refrigerant stagnated in the compressor 1 and discharging the liquid refrigerant to the outside of the compressor 1.

It has been described that it is desirable to change the reference phase $\theta f$ in increments of 60 degrees, such as 0 degrees, 60 degrees, and so on in order to prevent an adverse effect such as motor noise and motor shaft vibration. However, it is desirable that the reference phase $\theta f$ is changed in increments of 120 degrees, such as 60 degrees, 180 degrees, and 300 degrees from the standpoint of preventing generation of noise and preventing a decrease in the input electric power to the motor 8. By changing the reference phase $\theta f$ in this manner, at the time of shifting from V0 or V7 to the dead time, it is possible to shift the mode to the regenerative mode gradually by using the PWM pattern for turning off two switching elements to which the current flows in the same direction, thereby enabling a voltage in which the rate of voltage change over time dV/dt is reduced to be output.

In the case of the reference phase $\theta f=180$ degrees, the voltage value gradually rises in the section (2) as illustrated in FIG. 17; however, the voltage value does not reach the voltage value of (3), and the voltage steeply increases in the section (3). Therefore, the rate of voltage change over time dV/dt cannot be reduced completely. In order to solve this problem, the winding impedance of the motor 8 is changed to increase the current value flowing to the switching elements or adjust the gate resistance (not illustrated) of the drive circuit for driving the switching elements to reduce or increase the dead time (reduce the dead time in the case of FIG. 17). Accordingly, the voltage value in the section (2) can be increased from zero to the voltage value in (3) while a low rate dV/dt is maintained, and thus noise to be generated can be reduced.

Figure 19:
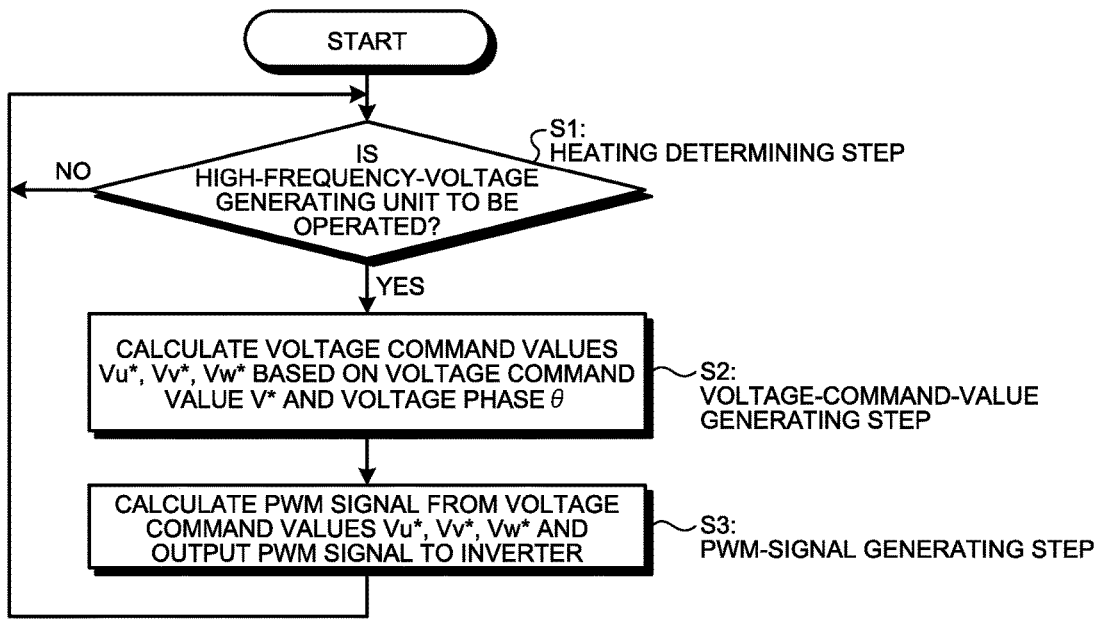
FIG. 19 is a flowchart illustrating an operation of the inverter control unit in the first embodiment.

The operation of the inverter control unit 10 will be explained next. FIG. 19 is a flowchart illustrating the operation of the inverter control unit 10 in the first embodiment.

(S1: Heating Determining Step)

The heating determining unit 12 determines whether to operate the high-frequency-voltage generating unit 11 by performing the operation described above while the operation of the compressor 1 is stopped. When the heating determining unit 12 determines that the high-frequency-voltage generating unit 11 is to be operated, i.e., the output value of the heating determining unit 12 is "1" (ON) (Yes at Step S1), the process proceeds to S2 to generate PWM signals for preheating. In contrast, when the heating determining unit 12 determines that the high-frequency-voltage generating unit 11 is not to be operated, i.e., the output value of the heating determining unit 12 is "0" (OFF) (No at Step S1), the heating determining unit 12 determines again whether to operate the high-frequency-voltage generating unit 11 after a preset time has passed.

(Step S2: Voltage-Command-Value Generating Step)

When the voltage-command selecting unit 13 selects a voltage command value V* and a voltage phase $\theta$ to shift from the zero vector (V0 or V7, for example) to the dead time, the voltage-command selecting unit 13 selects the voltage phase $\theta$ such that a PWM pattern for turning off two switching elements to which the current flows in the same direction is generated, calculates Vu*, Vv*, and Vw* in accordance with Equations (1) to (3), and outputs the calculated voltage command values Vu*, Vv*, and Vw* to the PWM-signal generating unit 26.

(S3: PWM-Signal Generating Step)

The PWM-signal generating unit 26 compares the voltage command values Vu*, Vv* and Vw* output from the voltage-command generating unit 25 with a carrier signal to obtain the PWM signals UP, VP, WP, UN, VN and WN and outputs these PWM signals to the inverter 9. Accordingly, the switching elements 18a to 18f of the inverter 9 are driven to apply a high-frequency voltage to the motor 8. By applying the high-frequency voltage to the motor 8, the motor 8 is efficiently heated due to the iron loss of the motor 8 and the copper loss generated by the current flowing in the windings. Due to heating of the motor 8, the liquid refrigerant stagnated in the compressor 1 is heated to be vaporized and is discharged to the outside of the compressor 1. After the process at S3, the process proceeds to S1, and it is determined whether further heating is required.

As described above, in the heat pump device 100 according to the first embodiment, when the liquid refrigerant is stagnated in the compressor 1, a high-frequency voltage is applied to the motor 8. Therefore, the motor 8 can be heated efficiently while suppressing noise. Accordingly, the liquid refrigerant stagnated in the compressor 1 can be heated efficiently and thus the stagnated refrigerant can be discharged to the outside of the compressor 1.

In the heat pump device 100 according to the first embodiment, when the refrigerant stagnated in the compressor 1 is to be heated, the inverter control unit 10 executes control by using a first switching pattern in which all of three switching elements on a positive voltage side or a negative voltage side of the inverter 9 are changed to an ON state, then executes control by using a second switching pattern in which two switching elements to which an electric current flows in the same direction when controlled by using the first switching pattern are changed to an OFF state, and then executes control by using a third switching pattern in which two switching elements on a reverse voltage side of the two switching elements that are changed to an OFF state by using the second switching pattern are changed to an ON state. Accordingly, a drop in electric power to the compressor 1 due to regeneration can be prevented while reducing the high-frequency noise.

If a high-frequency voltage equal to or higher than the operating frequency at the time of compression operation is applied to the motor 8, a rotor in the motor 8 cannot follow the frequency, and therefore the rotor does not rotate and vibrate. Therefore, it is desirable that the voltage-command selecting unit 13 outputs the voltage phase $\theta$ equal to or higher than the operating frequency during the compression operation at S2.

Generally, the operation frequency during the compression operation is 1 kilohertz at most. Therefore, a high-frequency voltage having a frequency equal to or higher than 1 kilohertz only has to be applied to the motor 8. If a high-frequency voltage having a frequency equal to or higher than 14 kilohertz is applied to the motor 8, vibration sound of the iron core of the motor 8 nearly approaches the upper limit of the audible frequency. Therefore, noise can be reduced. Thus, for example, the voltage-command selecting unit 13 outputs the voltage phase $\theta$ providing a high-frequency voltage of about 20 kilohertz.

However, when the frequency of the high-frequency voltage exceeds the maximum rated frequency of the switching elements 18a to 18f, a load or power supply short-circuit may occur due to the damage to the switching elements 18a to 18f, and this may lead to the generation of smoke or start of a fire. For this reason, it is desired to set the frequency of the high-frequency voltage to be equal to or lower than the maximum rated frequency, thereby ensuring reliability.

Furthermore, in order to achieve a high efficiency, for example, a motor having an IPM structure or a concentrated winding motor having a small coil end and a low winding resistance has been widely used for the motor of the compressor for recent heat pump devices. The concentrated winding motor has a low winding resistance and thus has a small amount of heat generation due to copper loss, and therefore a large current needs to be caused to flow to the windings. If a large current is caused to flow to the windings, then the current flowing to the inverter 9 also increases, which results in an increase in inverter loss. Therefore, if heating by the high-frequency voltage application described above is performed, an inductance component due to the high frequency increases, thereby increasing the winding impedance. When the winding impedance is increased, the current flowing to the windings decreases and the copper loss is reduced; however, the iron loss due to the application of the high-frequency voltage is generated corresponding to the amount of reduced copper loss; therefore, heating can be performed efficiently. Furthermore, because the current flowing to the windings decreases, the current flowing to the inverter also decreases. Thus, the loss of the inverter 9 can be reduced and heating can be performed more efficiently.

When heating by the high-frequency voltage application described above is performed, if the compressor 1 has a motor having an IPM structure, the rotor surface where the high-frequency magnetic fluxes interlink with each other also becomes a heat generating portion. Therefore, an increase in the area contacting the refrigerant and prompt heating of the compression mechanism can be realized. Thus, the refrigerant can be heated efficiently.

Currently, it is typically mainstream to use semiconductors made of silicon (Si) as a material for the switching elements 18a to 18f that constitute the inverter 9 and the reflux diodes 19a to 19f that are connected to the respective switching elements 18a to 18f in inverse-parallel. However, instead of the above semiconductor, a wide gap semiconductor whose material is silicon carbide (SiC), gallium nitride (GaN) or diamond may be used.

Switching elements and diode elements made from such a wide bandgap semiconductor have a high voltage resistance and a high allowable current density. Therefore, downsizing of the switching elements and the diode elements is possible, and by using these downsized switching elements and diode elements, downsizing of a semiconductor module in which these elements are incorporated therein can be realized.

The switching elements and the diode elements made from such a wide bandgap semiconductor also have a high heat resistance. Accordingly, downsizing of a radiator fin of a heat sink and air cooling of a water cooling part can be realized, thereby enabling a semiconductor module to be further downsized.

Furthermore, the switching elements and the diode elements made from such a wide bandgap semiconductor have low power loss. Therefore, the switching elements and the diode elements can be made to have a high efficiency, thereby enabling a semiconductor module to be highly efficient.

Moreover, because switching can be performed at high frequency, a current with a higher frequency can be caused to flow to the motor 8. Therefore, the current flowing to the inverter 9 can be reduced because of the reduction of the wiring current due to the increase of the wiring impedance of the motor 8. Accordingly, it is possible to obtain a heat pump device with a higher efficiency. Furthermore, because the frequency can be increased easily, there is an advantage in that the frequency exceeding the audible frequency can be easily set and thus it becomes easy to take measures against noise.

While it is desirable that both the switching elements and the diode elements are made from a wide bandgap semiconductor, it is also sufficient that either the switching elements or the diode elements are made from a wide bandgap semiconductor. Even when at least one of the switching elements 18a to 18f or one of the reflux diodes 19a to 19f is made from a wide bandgap semiconductor, the effects described in the present embodiment can be obtained.

Furthermore, similar effects can be obtained by using a MOSFET (Metal-Oxide-Semiconductor Field-Effect Transistor) having a super junction structure that is known as a highly efficient switching element.

In a compressor having a scroll mechanism, it is difficult to relieve high pressure in the compression chamber. Therefore, there is a high possibility of causing damage to the compression mechanism due to the excessive stress applied to the compression mechanism in the case of liquid compression, as compared to a compressor of other systems. However, in the heat pump device 100 according to the first embodiment, efficient heating of the compressor 1 is possible, and stagnation of the liquid refrigerant in the compressor 1 can be suppressed. Accordingly, liquid compression can be prevented; therefore, the heat pump device 100 is beneficial even when a scroll compressor is used as the compressor 1.

Furthermore, when a heating device having a frequency of 10 kHz and an output exceeding 50 W is used, the heating device may be subjected to the restriction of laws and regulations. For this reason, it may be as well to admit that the amplitude of the voltage command value or the frequency is adjusted in advance such that the output does not exceed 50 W.

The inverter control unit 10 can be configured from a discrete system of a CPU (Central Processing Unit), a DSP (Digital Signal Processor), or a microcomputer as described above. Alternatively, the inverter control unit 10 may be configured from electrical circuit elements of an analog circuit, a digital circuit, or the like.

Second Embodiment

In a second embodiment, an example of a circuit configuration of the heat pump device 100 is explained. The heat pump device 100 in which the compressor 1, the four-way valve 2, the heat exchanger 3, the expansion mechanism 4, and the heat exchanger 5 are sequentially connected by the pipe is illustrated, for example, in FIG. 1. In the second embodiment, the heat pump device 100 having a more specific configuration is explained.

Figure 20:
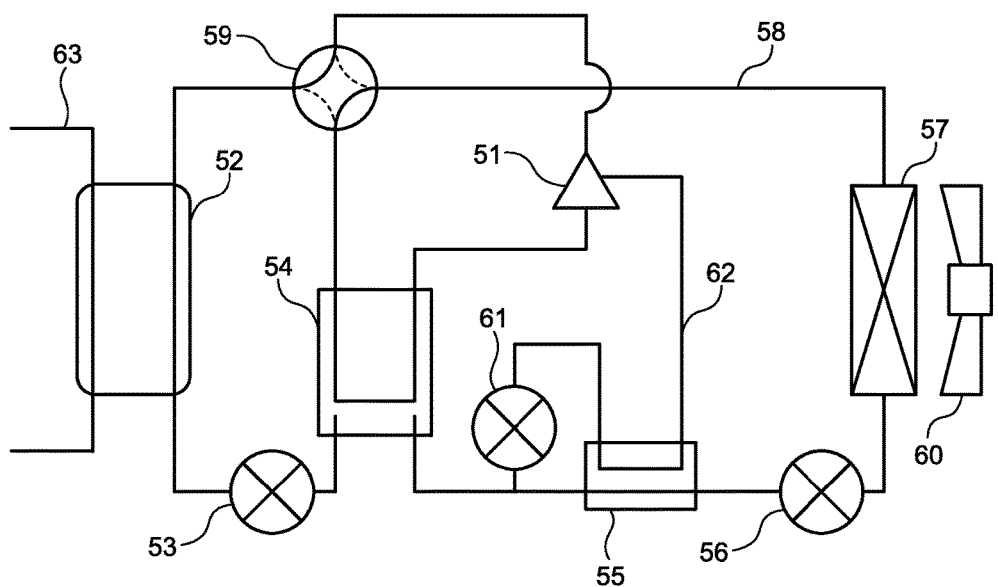
FIG. 20 is a circuit configuration diagram of a heat pump device according to a second embodiment.
Figure 21:
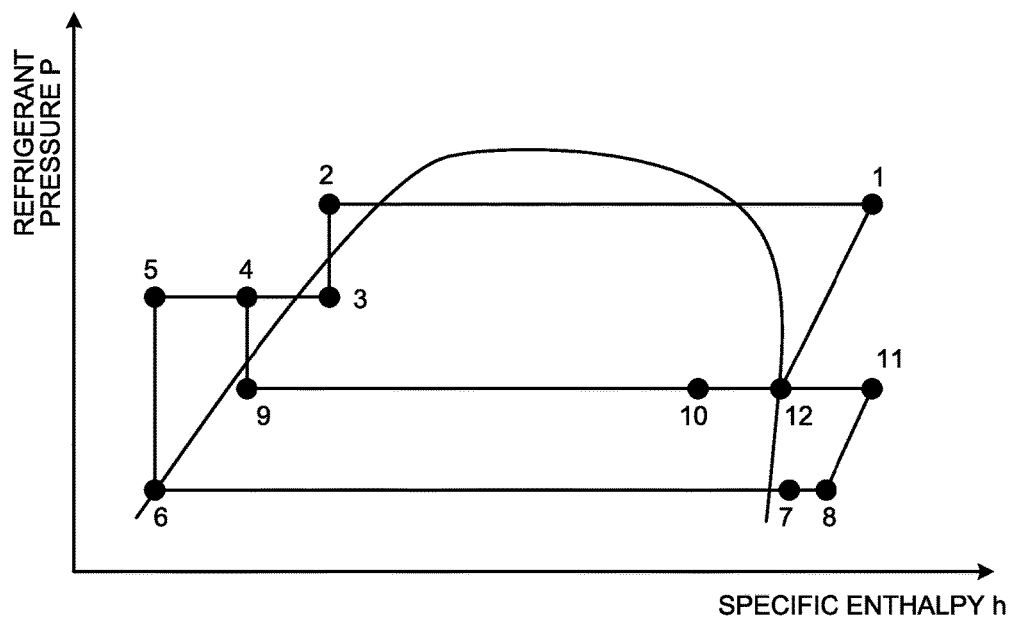
FIG. 21 is a Mollier chart of a state of a refrigerant of the heat pump device illustrated in FIG. 20.

FIG. 20 is a circuit configuration diagram of the heat pump device 100 according to the second embodiment. FIG. 21 is a Mollier diagram of a state of a refrigerant of the heat pump device 100 illustrated in FIG. 20. In FIG. 21, the horizontal axis indicates the specific enthalpy and the vertical axis indicates the refrigerant pressure.

The heat pump device 100 includes a main refrigerant circuit 58, in which a compressor 51, a heat exchanger 52, an expansion mechanism 53, a receiver 54, an internal heat exchanger 55, an expansion mechanism 56, and a heat exchanger 57 are sequentially connected by a pipe and through which a refrigerant circulates. In the main refrigerant circuit 58, a four-way valve 59 is provided on the discharge side of the compressor 51; therefore, the circulation direction of the refrigerant can be switched. A fan 60 is provided near the heat exchanger 57. The compressor 51 is the compressor 1 explained in the first embodiment described above and is a compressor that includes the motor 8 driven by the inverter 9 and the compression mechanism 7. Furthermore, the heat pump device 100 includes an injection circuit 62 that connects, by a pipe, from between the receiver 54 and the internal heat exchanger 55 to an injection pipe of the compressor 51. An expansion mechanism 61 and the internal heat exchanger 55 are sequentially connected to the injection circuit 62.

A water circuit 63, in which water is circulated, is connected to the heat exchanger 52. A device that uses water, such as a hot water dispenser and a radiator, examples of which include a radiator and a floor heating, is connected to the water circuit 63.

First, an explanation will be given of an operation of the heat pump device 100 during the heating operation. In the heating operation, the four-way valve 59 is set in the direction of the solid line. The heating operation includes not only heating used for air conditioning but also hot-water supply for applying heat to water to make hot water.

The gas-phase refrigerant (at point 1 in FIG. 21) that has become a refrigerant having a high temperature and a high pressure in the compressor 51 is discharged from the compressor 51 and exchanges heat in the heat exchanger 52, which functions as a condenser and a radiator, to be liquefied (at point 2 in FIG. 21). At this point, water circulating in the water circuit 63 is heated by the heat radiated from the refrigerant and is used for heating and hot-water supply.

The liquid-phase refrigerant liquefied in the heat exchanger 52 is decompressed in the expansion mechanism 53 and enters a gas-liquid two-phase state (at point 3 in FIG. 21). The refrigerant that has entered a gas-liquid two-phase state in the expansion mechanism 53 exchanges heat with the refrigerant drawn into the compressor 51 by the receiver 54 so as to be cooled and liquefied (at point 4 in FIG. 21). The liquid-phase refrigerant liquefied in the receiver 54 is divided between the main refrigerant circuit 58 and the injection circuit 62 and flows therein.

The liquid-phase refrigerant flowing in the main refrigerant circuit 58 exchanges heat with the refrigerant flowing in the injection circuit 62, which is decompressed in the expansion mechanism 61 and has entered a gas-liquid two-phase state, in the internal heat exchanger 55 and is further cooled (at point 5 in FIG. 21). The liquid-phase refrigerant cooled in the internal heat exchanger 55 is decompressed in the expansion mechanism 56 and enters a gas-liquid two-phase state (at point 6 in FIG. 21). The refrigerant that has entered a gas-liquid two-phase state in the expansion mechanism 56 exchanges heat with the outside air in the heat exchanger 57, which functions as an evaporator, and is heated (at point 7 in FIG. 21). The refrigerant heated in the heat exchanger 57 is further heated in the receiver 54 (at point 8 in FIG. 21) and is drawn into the compressor 51.

On the other hand, as described above, the refrigerant flowing through the injection circuit 62 is decompressed in the expansion mechanism 61 (at point 9 in FIG. 21) and exchanges heat in the internal heat exchanger 55 (at point 10 in FIG. 21). The refrigerant (injection refrigerant) that has exchanged heat in the internal heat exchanger 55 and is in the gas-liquid two-phase state flows into the compressor 51 from the injection pipe of the compressor 51 while remaining in the gas-liquid two-phase state.

In the compressor 51, the refrigerant drawn in from the main refrigerant circuit 58 (at point 8 in FIG. 21) is compressed to an intermediate pressure and heated (at point 11 in FIG. 21). The injection refrigerant (at point 10 in FIG. 21) joins the refrigerant compressed to the intermediate pressure and heated (at point 11 in FIG. 21), thereby the temperature of the refrigerant decreases (at point 12 in FIG. 21). The refrigerant having the decreased temperature (at point 12 in FIG. 21) is further compressed and heated to have a high temperature and a high pressure, and is discharged (at point 1 in FIG. 21).

When the injection operation is not performed, the aperture of the expansion mechanism 61 is fully closed. In other words, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51. The aperture of the expansion mechanism 61 is electronically controlled by a control unit of a microcomputer or the like.

The operation of the heat pump device 100 during the cooling operation is explained next. In the cooling operation, the four-way valve 59 is set in the direction indicated by the broken line. The cooling operation includes not only cooling used for air conditioning but also drawing heat from water to make cold water, performing refrigeration, and the like.

The gas-phase refrigerant (at point 1 in FIG. 21) that has become a refrigerant having a high temperature and a high pressure in the compressor 51 is discharged from the compressor 51 and exchanges heat in the heat exchanger 57, which functions as a condenser and a radiator, to be liquefied (at point 2 in FIG. 21). The liquid-phase refrigerant liquefied in the heat exchanger 57 is decompressed in the expansion mechanism 56 and enters a gas-liquid two-phase state (at point 3 in FIG. 21). The refrigerant that has entered a gas-liquid two-phase state in the expansion mechanism 56 exchanges heat in the internal heat exchanger 55 so as to be cooled and liquefied (at point 4 in FIG. 21). In the internal heat exchanger 55, the refrigerant that has entered a gas-liquid two-phase state in the expansion mechanism 56 exchanges heat with the refrigerant (at point 9 in FIG. 21) that has entered a gas-liquid two-phase state by decompressing the liquid-phase refrigerant liquefied in the internal heat exchanger 55, in the expansion mechanism 61. The liquid-phase refrigerant (at point 4 in FIG. 21) exchanged heat in the internal heat exchanger 55 is divided between the main refrigerant circuit 58 and the injection circuit 62 and flows therein.

The liquid-phase refrigerant flowing in the main refrigerant circuit 58 then exchanges heat with the refrigerant drawn into the compressor 51 in the receiver 54 and is further cooled (at point 5 in FIG. 21). The liquid-phase refrigerant cooled in the receiver 54 is decompressed in the expansion mechanism 53 and enters a gas-liquid two-phase state (at point 6 in FIG. 21). The refrigerant that has entered a gas-liquid two-phase state in the expansion mechanism 53 exchanges heat in the heat exchanger 52, which functions as an evaporator, and is heated (at point 7 in FIG. 21). At this point, because the refrigerant absorbs heat, water circulating in the water circuit 63 is cooled and used for cooling, refrigeration, or the like. Then, the refrigerant heated in the heat exchanger 52 is further heated in the receiver 54 (at point 8 in FIG. 21) and drawn into the compressor 51.

On the other hand, as described above, the refrigerant flowing through the injection circuit 62 is decompressed in the expansion mechanism 61 (at point 9 in FIG. 21) and exchanges heat in the internal heat exchanger 55 (at point 10 in FIG. 21). The refrigerant (injection refrigerant) that has exchanged heat in the internal heat exchanger 55 and is in the gas-liquid two-phase state flows in from the injection pipe of the compressor 51 while remaining in the gas-liquid two-phase state. A compressing operation in the compressor 51 is the same as the compressing operation during the heating operation.

When the injection operation is not performed, as in the heating operation, the aperture of the expansion mechanism 61 is fully closed so as not to result in the refrigerant flowing into the injection pipe of the compressor 51.

In the above explanations, the heat exchanger 52 has been explained as a heat exchanger like a plate type heat exchanger that exchanges heat between the refrigerant and water circulating in the water circuit 63. The heat exchanger 52 is not limited thereto and may be other types of heat exchangers that exchange heat between a refrigerant and air. The water circuit 63 may not be a circuit in which water is circulated, but may be a circuit in which a fluid other than water is circulated.

As described above, the heat pump device 100 can be used for a heat pump device using an inverter compressor in an air conditioner, a heat pump water heater, a refrigerator, a freezing machine, and the like.

The invention claimed is:

1. A heat pump device comprising:
a compressor compressing a refrigerant;
a motor driving the compressor;
an inverter applying an alternating-current voltage to the motor and including three switching elements on each of a positive voltage side and a negative voltage side; and
an inverter control unit generating a control signal for controlling the inverter, wherein
the inverter control unit outputs to the inverter a first switching pattern in which all of three switching elements on the positive voltage side or the negative voltage side of the inverter are changed to an ON state and all of three switching elements on a reverse voltage side are changed to an OFF state, then outputs to the inverter a second switching pattern in which two switching elements to which an electric current flows in a same direction when controlled by using the first switching pattern are changed from an ON state to an OFF state and the three switching elements on a reverse voltage side are maintained in an OFF state, and then outputs to the inverter a third switching pattern in which two switching elements on a reverse voltage side of the two switching elements that are changed from an ON state to an OFF state by using the second switching pattern are changed to an ON state.

2. The heat pump device according to claim 1, wherein the inverter control unit includes
a voltage-command selecting unit selecting a phase angle for generating three voltage command values Vu*, Vv*, and Vw* by alternately switching between preset two values in synchronization with a reference signal, and
the inverter control unit generates six drive signals corresponding to respective switching elements of the inverter by comparing the three voltage command values selected by the voltage-command selecting unit with the reference signal.

3. The heat pump device according to claim 2, wherein the reference signal is a signal with which a top and a bottom in changes over time are able to be specified, and
the voltage-command selecting unit switches the three voltage command values Vu*, Vv*, and Vw* at both timings of the top and the bottom of the reference signal.

4. The heat pump device according to claim 2, wherein the reference signal is a signal with which a top and a bottom in changes of a value with respect to time are able to be specified, and
the voltage-command selecting unit switches the three voltage command values Vu*, Vv*, and Vw* at a timing of either a top or a bottom of the reference signal.

5. The heat pump device according to claim 1, wherein the inverter control unit operates either in a compression operation mode in which the compressor is caused to compress a refrigerant or in a heating operation mode in which the compressor is heated,
when the inverter is operated in the compression operation mode, the inverter is caused to generate an alternating-current voltage having a frequency at which the motor rotates, and
when the inverter is operated in the heating operation mode, the inverter is caused to generate an alternating-current voltage having a frequency at which the motor does not rotate and which is higher than the frequency of the alternating-current voltage to be generated in a case of the compression operation mode.

6. The heat pump device according to claim 1, wherein at least one of switching elements included in the inverter or a diode included in the inverter is made from a wide bandgap semiconductor.

7. The heat pump device according to claim 6, wherein the wide bandgap semiconductor is silicon carbide, a gallium nitride material, or diamond.

8. An air conditioner comprising the heat pump device according to claim 1.

9. A heat pump water heater comprising the heat pump device according to claim 1.

10. A refrigerator comprising the heat pump device according to claim 1.

11. A freezing machine comprising the heat pump device according to claim 1.

* * * * *